(12) United States Patent
Marriott et al.

(10) Patent No.: US 7,565,036 B2
(45) Date of Patent: Jul. 21, 2009

(54) IMAGE SCALING ARRANGEMENT

(75) Inventors: Greg Marriott, Honolulu, HI (US); Jesse Boettcher, San Jose, CA (US); Thomas Dowdy, Sunnyvale, CA (US); David Heller, Los Altos, CA (US); Jeff Miller, Mountain View, CA (US); Jeffrey L. Robbin, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 11/749,599

(22) Filed: May 16, 2007

(65) Prior Publication Data

US 2007/0217716 A1    Sep. 20, 2007

Related U.S. Application Data

(63) Continuation of application No. 10/973,657, filed on Oct. 25, 2004.

(51) Int. Cl.
*G06K 9/54* (2006.01)
*G06F 17/00* (2006.01)

(52) U.S. Cl. ...................... 382/305; 707/101

(58) Field of Classification Search .............. 382/305, 382/312; 709/219, 227, 231; 707/1, 10, 707/101; 711/133; 717/109
See application file for complete search history.

(56) References Cited

U.S. PATENT DOCUMENTS

| | | | |
|---|---|---|---|
| 4,090,216 A | 5/1978 | Constable | |
| 4,386,345 A | 5/1983 | Narveson et al. | |
| 4,451,849 A | 5/1984 | Fuhrer | |
| 4,589,022 A | 5/1986 | Prince et al. | |
| 4,908,523 A | 3/1990 | Snowden et al. | |
| 4,928,307 A | 5/1990 | Lynn | |
| 4,951,171 A | 8/1990 | Tran et al. | |
| 5,406,305 A | 4/1995 | Shimomura et al. | |
| 5,559,945 A | 9/1996 | Beaudet et al. | |
| 5,583,993 A | 12/1996 | Foster et al. | |
| 5,608,698 A | 3/1997 | Yamanoi et al. | |
| 5,616,876 A | 4/1997 | Cluts | |
| 5,617,386 A | 4/1997 | Choi | |
| 5,670,985 A | 9/1997 | Cappels, Sr. et al. | |
| 5,684,513 A | 11/1997 | Decker | |
| 5,710,922 A | 1/1998 | Alley et al. | |

(Continued)

FOREIGN PATENT DOCUMENTS

DE    43 34 773 A1    4/1994

(Continued)

OTHER PUBLICATIONS

"Apple Announces iTunes 2," Press Release, Apple Computer, Inc., Oct. 23, 2001.

(Continued)

*Primary Examiner*—Kanji Patel
(74) *Attorney, Agent, or Firm*—Beyer Law Group LLP

(57) ABSTRACT

Methods and system for transferring images between devices is disclosed. For example, differently scaled images by a host device may automatically and/or selectively be transferred to a media player for display. In turn, appropriately scaled images may be transferred automatically and/or selectively to another display device for example a TV, camera or printer. The selectivity may occur either at the host level or at the player level.

43 Claims, 9 Drawing Sheets

U.S. PATENT DOCUMENTS

| | | | |
|---|---|---|---|
| 5,712,949 A | 1/1998 | Kato et al. | |
| 5,721,949 A | 2/1998 | Smith et al. | |
| 5,726,672 A | 3/1998 | Hernandez et al. | |
| 5,739,451 A | 4/1998 | Winksy et al. | |
| 5,740,143 A | 4/1998 | Suetomi | |
| 5,778,374 A * | 7/1998 | Dang et al. | 707/101 |
| 5,815,225 A | 9/1998 | Nelson | |
| 5,822,288 A | 10/1998 | Shinada | |
| 5,835,721 A | 11/1998 | Donahue et al. | |
| 5,835,732 A | 11/1998 | Kikinis et al. | |
| 5,864,868 A | 1/1999 | Contois | |
| 5,870,710 A | 2/1999 | Ozawa et al. | |
| 5,918,303 A | 6/1999 | Yamaura et al. | |
| 5,920,728 A | 7/1999 | Hallowell et al. | |
| 5,923,757 A | 7/1999 | Hocker et al. | |
| 5,952,992 A | 9/1999 | Helms | |
| 6,006,274 A | 12/1999 | Hawkins et al. | |
| 6,009,237 A | 12/1999 | Hirabayashi et al. | |
| 6,011,585 A | 1/2000 | Anderson | |
| 6,018,705 A | 1/2000 | Gaudet et al. | |
| 6,041,023 A | 3/2000 | Lakhansingh | |
| 6,052,654 A | 4/2000 | Gaudet et al. | |
| 6,108,426 A | 8/2000 | Stortz | |
| 6,122,340 A | 9/2000 | Darley et al. | |
| 6,161,944 A | 12/2000 | Leman | |
| 6,172,948 B1 | 1/2001 | Keller et al. | |
| 6,179,432 B1 | 1/2001 | Zhang et al. | |
| 6,191,939 B1 | 2/2001 | Burnett | |
| 6,208,044 B1 | 3/2001 | Viswanadham et al. | |
| 6,216,131 B1 | 4/2001 | Liu et al. | |
| 6,217,183 B1 | 4/2001 | Shipman | |
| 6,248,946 B1 | 6/2001 | Dwek | |
| 6,295,541 B1 | 9/2001 | Bodnar et al. | |
| 6,298,314 B1 | 10/2001 | Blackadar et al. | |
| 6,332,175 B1 | 12/2001 | Birrell et al. | |
| 6,336,365 B1 | 1/2002 | Blackadar et al. | |
| 6,336,727 B1 | 1/2002 | Kim | |
| 6,341,316 B1 | 1/2002 | Kloba et al. | |
| 6,357,147 B1 | 3/2002 | Darley et al. | |
| 6,377,530 B1 | 4/2002 | Burrows | |
| 6,452,610 B1 | 9/2002 | Reinhardt et al. | |
| 6,467,924 B2 | 10/2002 | Shipman | |
| 6,493,652 B1 | 12/2002 | Ohlenbusch et al. | |
| 6,536,139 B2 | 3/2003 | Darley et al. | |
| 6,549,497 B2 | 4/2003 | Miyamoto et al. | |
| 6,560,903 B1 | 5/2003 | Darley | |
| 6,587,403 B1 | 7/2003 | Keller et al. | |
| 6,587,404 B1 | 7/2003 | Keller et al. | |
| 6,605,038 B1 | 8/2003 | Teller et al. | |
| 6,611,789 B1 | 8/2003 | Darley | |
| 6,621,768 B1 | 9/2003 | Keller et al. | |
| 6,623,427 B2 | 9/2003 | Mandigo | |
| 6,731,312 B2 | 5/2004 | Robbin | |
| 6,760,536 B1 | 7/2004 | Amir et al. | |
| 6,762,741 B2 | 7/2004 | Weindorf | |
| 6,794,566 B2 | 9/2004 | Pachet | |
| 6,799,226 B1 | 9/2004 | Robbin et al. | |
| 6,801,964 B1 | 10/2004 | Mahdavi | |
| 6,870,529 B1 | 3/2005 | Davis | |
| 6,871,063 B1 | 3/2005 | Schiffer | |
| 6,876,947 B1 | 4/2005 | Darley et al. | |
| 6,882,955 B1 | 4/2005 | Ohlenbusch et al. | |
| 6,898,550 B1 | 5/2005 | Blackadar et al. | |
| 6,911,971 B2 | 6/2005 | Suzuki et al. | |
| 6,918,677 B2 | 7/2005 | Shipman | |
| 6,930,709 B1 | 8/2005 | Creamer et al. | |
| 6,934,812 B1 | 8/2005 | Robbin et al. | |
| 6,950,087 B2 | 9/2005 | Knox et al. | |
| 7,046,230 B2 | 5/2006 | Zadesky | |
| 7,062,225 B2 | 6/2006 | White | |
| 7,084,856 B2 | 8/2006 | Huppi | |
| 7,084,921 B1 | 8/2006 | Ogawa | |
| 7,092,946 B2 * | 8/2006 | Bodnar | 707/10 |
| 7,124,125 B2 * | 10/2006 | Cook et al. | 707/1 |
| 7,143,241 B2 * | 11/2006 | Hull | 711/133 |
| 7,146,437 B2 | 12/2006 | Robbin et al. | |
| 7,149,813 B2 | 12/2006 | Flanagin et al. | |
| 7,162,543 B2 | 1/2007 | Fischer et al. | |
| 7,166,791 B2 | 1/2007 | Robbin et al. | |
| 7,191,244 B2 * | 3/2007 | Jennings et al. | 709/231 |
| 7,213,228 B2 * | 5/2007 | Putterman et al. | 717/109 |
| 7,234,026 B2 | 6/2007 | Robbin et al. | |
| 7,277,928 B2 * | 10/2007 | Lennon | 709/219 |
| 2001/0041021 A1 | 11/2001 | Boyle et al. | |
| 2001/0042107 A1 | 11/2001 | Palm | |
| 2002/0002413 A1 | 1/2002 | Tokue | |
| 2002/0013784 A1 | 1/2002 | Swanson | |
| 2002/0045961 A1 | 4/2002 | Gibbs et al. | |
| 2002/0046315 A1 | 4/2002 | Miller et al. | |
| 2002/0055934 A1 | 5/2002 | Lipscomb et al. | |
| 2002/0090912 A1 | 7/2002 | Cannon et al. | |
| 2002/0116082 A1 | 8/2002 | Gudorf | |
| 2002/0152045 A1 | 10/2002 | Dowling et al. | |
| 2002/0156833 A1 | 10/2002 | Maurya et al. | |
| 2002/0161865 A1 | 10/2002 | Nguyen | |
| 2002/0173273 A1 | 11/2002 | Spurgat et al. | |
| 2002/0189426 A1 | 12/2002 | Hirade et al. | |
| 2003/0037254 A1 | 2/2003 | Fischer et al. | |
| 2003/0046434 A1 | 3/2003 | Flanagin et al. | |
| 2003/0074457 A1 | 4/2003 | Kluth | |
| 2003/0076301 A1 | 4/2003 | Tsuk et al. | |
| 2003/0079038 A1 * | 4/2003 | Robbin et al. | 709/232 |
| 2003/0095096 A1 | 5/2003 | Robbin et al. | |
| 2003/0097379 A1 | 5/2003 | Ireton | |
| 2003/0133694 A1 | 7/2003 | Yeo | |
| 2003/0167318 A1 | 9/2003 | Robbin et al. | |
| 2003/0229490 A1 | 12/2003 | Etter | |
| 2004/0001395 A1 | 1/2004 | Keller et al. | |
| 2004/0001396 A1 | 1/2004 | Keller et al. | |
| 2004/0012556 A1 | 1/2004 | Yong et al. | |
| 2004/0055446 A1 | 3/2004 | Robbin et al. | |
| 2004/0069122 A1 | 4/2004 | Wilson | |
| 2004/0076086 A1 | 4/2004 | Keller | |
| 2004/0086120 A1 | 5/2004 | Akins, III et al. | |
| 2004/0094018 A1 | 5/2004 | Ueshima et al. | |
| 2004/0198436 A1 | 10/2004 | Alden | |
| 2004/0224638 A1 | 11/2004 | Fadell et al. | |
| 2004/0267825 A1 | 12/2004 | Novak et al. | |
| 2005/0015254 A1 | 1/2005 | Beaman | |
| 2005/0152294 A1 | 7/2005 | Yu et al. | |
| 2005/0166153 A1 | 7/2005 | Eytchison et al. | |
| 2005/0245839 A1 | 11/2005 | Stivoric et al. | |
| 2006/0013414 A1 | 1/2006 | Shih | |
| 2006/0068760 A1 | 3/2006 | Hameed et al. | |
| 2006/0190577 A1 | 8/2006 | Yamada | |
| 2006/0221788 A1 | 10/2006 | Lindahl et al. | |
| 2006/0265503 A1 | 11/2006 | Jones et al. | |
| 2007/0028009 A1 | 2/2007 | Robbin et al. | |
| 2007/0124679 A1 | 5/2007 | Jeong et al. | |

FOREIGN PATENT DOCUMENTS

| | | |
|---|---|---|
| DE | 44 45 023 A1 | 6/1996 |
| EP | 0 127 139 | 5/1984 |
| EP | 0578604 | 1/1994 |
| EP | 0 757 437 | 2/1997 |
| EP | 0 863 469 | 9/1998 |
| EP | 0 917 077 | 5/1999 |
| EP | 0 982 732 | 3/2000 |
| EP | 1 028 425 | 8/2000 |
| EP | 1028426 A2 | 8/2000 |
| EP | 1 076 302 | 2/2001 |
| EP | 1289197 | 3/2003 |
| EP | 1536612 | 6/2005 |

| | | |
|---|---|---|
| EP | 1566948 | 8/2005 |
| GB | 2384399 | 7/2003 |
| JP | 59-023610 | 2/1984 |
| JP | 2000-134522 | 5/2000 |
| JP | 2000-224099 | 8/2000 |
| JP | 2000-299834 | 10/2000 |
| JP | 2001-236286 | 8/2001 |
| JP | 2001-312338 | 11/2001 |
| JP | 2002-076977 | 3/2002 |
| JP | 2002-175467 | 6/2002 |
| JP | 2003-099357 | 4/2003 |
| JP | 2003-188792 | 7/2003 |
| JP | 2003-259333 | 9/2003 |
| JP | 2003-319365 | 11/2003 |
| JP | 2004-021720 | 1/2004 |
| JP | 2004-219731 | 8/2004 |
| JP | 2004-220420 | 8/2004 |
| WO | WO 01/33569 | 6/1995 |
| WO | WO 95/16950 | 6/1995 |
| WO | WO 98/17032 | 4/1998 |
| WO | WO 00/22820 | 4/2000 |
| WO | WO 01/65413 | 9/2001 |
| WO | WO 01/67753 | 9/2001 |
| WO | WO 02/25610 | 3/2002 |
| WO | WO 03/023786 | 3/2003 |
| WO | WO 03/067202 | 8/2003 |
| WO | 2004-061850 A1 | 7/2004 |
| WO | WO 2004/055637 | 7/2004 |
| WO | WO2004/084413 A2 | 9/2004 |
| WO | WO 2005/031737 | 4/2005 |
| WO | WO 2005/048644 | 5/2005 |
| WO | WO 2005/008505 | 7/2005 |
| WO | WO 2005/109781 | 11/2005 |
| WO | WO 2006071364 | 6/2006 |

OTHER PUBLICATIONS

"Apple Introduces iTunes—World's Best and Easiest to Use Jukebox Software," Macworld Expo, San Francisco, Jan. 9, 2001.
"Apple's iPod Available in Stores Tomorrow," Press Release, Apple Computer, Inc., Nov. 9, 2001.
"Nomad Jukebox," User Guide, Creative Technology Ltd., Version 1, Aug. 2000.
"SoundJam MP Plus Manual, version 2.0"—MP3 Player and Encoder for Macintosh by Jeffrey Robbin, Bill Kincaid and David Heller, manual by Tom Negrino, published by Casady & Greene, Inc., 2000.
"Digital Still Cameras—Downloading Images to a Computer," Mimi Chakarova et al., Multi-Media Reporting and Convergence, 2 pgs.
Adam C. Engst, "SoundJam Keeps on Jammin'," Jun. 19, 2000, http://db.tidbits.com/getbits.acgi?tbart=05988.
Andrew Birrell, "Personal Jukebox (PJB)," Oct. 13, 2000, http://birrell.org/andrew/talks/pjb-overview.ppt.
Compaq, "Personal Jukebox," Jan. 24, 2001, http://research.compaq.com/SRC/pjb/.
De Herrera, Chris, "Microsoft ActiveSync 3.1," Version 1.02, Oct. 13, 2000.
IEEE 139—Wikipedia, 1995, http://www.wikipedia.org/wiki/Firewire.
Internartional Search Report dated Jul. 10, 2007 in corresponding application No. PCT/US2006/048738.
International Search Report dated Apr. 5, 2006 from corresponding International Application No. PCT/US2005/038819.
International Search Report dated May 21, 2007 from corresponding PCT Application No. PCT/US2006/048670.
iTunes 2, Playlist Related Help Screens, iTunes v2.0, Apple Computer, Inc., Oct. 23, 2001.
iTunes, Playlist Related Help Screens, iTunes v1.0, Apple Computer, Inc., Jan. 2001.
Miniman, "Applian Software's Replay Radio and Player v1.02," Product review, pocketnow.com, http://www.pocketnow.com/reviews/replay/replay.htm, Jul. 31, 2001.
Musicmatch, "Musicmatch and Xing Technology Introduce Musicmatch Jukebox," May 18, 1998, http://www.musicmatch.com/info/company/press/releases/?year=1998 &release=2.
Personal Jukebox (PJB), "Systems Research Center and PAAD," Compaq Computer Corp., Oct. 13, 2000, http://research.compaq.com/SRC/pjb/.
Sinitsyn, Alexander. "A Synchronization Framework for Personal Mobile Servers," Pervasice Computing and Communications Workshops, 2004. Proceedings of the Second IEEE Annual Conference on, Piscataway, NJ, USA, IEEE, Mar. 14, 2004, pp. 208-212.
SoundJam MP Plus, Representative Screens, published by Casady & Greene, Inc., Salinas, CA, 2000.
Specification Sheet, iTunes 2, Apple Computer, Inc., Oct. 31, 2001.
Steinberg, "Sonicblue Rio Car," Product Review, Dec. 12, 2000, http://electronics.cnet.com/electronics/0-6342420-1304-4098389.html.
Travis Butler, "Archos Jukebox 6000 Challenges Nomad Jukebox," Aug. 13, 2001, http://db.tidbits.com/getbits.acgi?tbart=06521.
Travis Butler, "Portable MP3: The Nomad Jukebox," Jan. 8, 2001, http://db.tidbits.com/getbits.acgi?tbart=06261.
"12.1" 925 Candela Mobile PC", downloaded from LCDHardware.com on Dec. 19, 2002, http://www.lcdhardware.com/panel/12_1_panel/default.asp.
"BL82 Series Backlit Keyboards", www.tg3electronics.com/products/backlit/backlit.htm, downloaded Dec. 19, 2002.
"Bluetooth PC Headsets—Enjoy Wireless VoIP Conversations: 'Connecting' Your Bluetooth Headset With Your Computer", Bluetooth PC Headsets; downloaded on Apr. 29, 2006 from http://www.bluetoothpcheadsets.com/connect.htm.
"Creative MuVo TX 256 MB," T3 Magazine, Aug. 17, 2004, http://www.t3.co.uk/reviews/entertainment/mp3_player/creative_muvo_tx_256mb [downloaded Jun. 6, 2006].
"Eluminx Illuminated Keyboard", downloaded Dec. 19, 2002, http://www.elumix.com/.
"How To Pair a Bluetooth Headset & Cell Phone", About.com; downloaded on Apr. 29, 2006 from http://mobileoffice.about.com/od/usingyourphone/ht/blueheadset_p.htm.
"Peripherals for Industrial Keyboards & Pointing Devices", Stealth Computer Corporation, downloaded on Dec. 19, 2002, http://www.stealthcomputer.com/peropherals_oem.htm.
"Poly-Optical Fiber Optic Membrane Switch Backlighting", downloaded Dec. 19, 2002, http://www.poly/optical.com/membrane_switches.html.
"Public Safety Technologies Tracer 2000 Computer", downloaded Dec. 19, 2002, http://www.pst911.com/traver.html.
"Quicktime Movie Playback Programming Guide", Apple Computer, Inc., Aug. 11, 2005.
"Quicktime Overview", Apple Computer, Inc., Aug. 11, 2005.
"Rocky Matrix Backlit Keyboard", downloaded Dec. 19, 2002, http://www.amrel.com/asi_matrixkeyboard.html.
"Sony Ericsson to introduce Auto pairing to improve Bluetooth connectivity between headsets and phones", Sep. 28, 2005 Press Release, Sony Ericsson Corporate; downloaded on Apr. 29, 2006 from 2http://www.sonyericsson.com/spg.jsp?cc=global&1c=en&ver=4001 &template=pc3_1_1&z . . ..
"TAOS, Inc., Announces Industry's First Ambient Light Sensor to Convert Light Intensity to Digital Signals", www.taosinc.com/pressrelease_090902.htm, downloaded Jan. 23, 2003.
"Toughbook 28: Powerful, Rugged and Wireless", Panasonic: Toughbook Models, downloaded Dec. 19, 2002, http://www.panasonic.com/computer/notebook/html/01a_s8.htm.
"When it Comes to Selecting a Projection TV, Toshiba Makes Everything Perfectly Clear, Previews of New Releases", www.bestbuy.com/HomeAudioVideo/Specials/ToshibaTVFeatures.asp, downloaded Jan. 23, 2003.
"WhyBuy: Think Pad", IBM ThinkPad Web Page Ease of Use, downloaded on Dec. 19, 2002, http://www.pc.ibm.com/us/thinkpad/easeofuse.html.
512MB Waterproof MP3 Player with FM Radio & Built-in Pedometer, Oregon Scientific, downloaded on Jul. 31, 2006 from http://www2.oregonscientific.com/shop/product.asp?cid=4&scid=11 &pid=581.

Alex Veiga, "AT&T Wireless Launching Music Service," Yahoo! Finance, Oct. 5, 2004, pp. 1/2.

Apple iPod Technical Specifications, iPod 20GB and 60GB Mac+PC, downloaded from http://www.apple.com/ipod/color/specs.html on Aug. 8, 2005.

Apple iTunes Smart Playlists, downloaded Apr. 5, 2005 from http://web.archive.org/web/20031002011316/www.apple.com/itunes/smartplaylists . . . pp. 1-2.

Bociurkiw, Michael, "Product Guide: Vanessa Matz", www.forbes.com/asap/2000/1127/vmartz_print.html, Nov. 27, 2000.

Creative: "Creative NOMAD MuVo TX," www.creative.com, Nov. 1, 2004, http://web.archive.org/web/20041024175952/www.creative.com/products/pfriendly.asp?product=9672 [downloaded Jun. 6, 2006].

Creative: "Creative NOMAD MuVo," www.creative.com, Nov. 1, 2004, http://web.archive.org/web/20041024759017/www.creative.com/products/product.asp?category=213&subcategory=215&product=110 [downloaded Jun. 7, 2006].

Creative: "MP3 Player," www.creative.com, Nov. 1, 2004, http://web.archive.org/web/20041024074823/www.creative.com/products/product.asp?category=213&subcategory=216&product=4983 [downloaded Jun. 7, 2006].

iAP Sports Lingo 0x09 Protocol V1.00, May 1, 2006.

International Search Report dated Feb. 4, 2003 in corresponding application No. PCT/US2002/033330.

International Search Report dated Dec. 5, 2007 in PCT Application No. PCT/US2007/004810.

International Search Report dated Jul. 2, 2007 in related case PCT/US2006/048669.

International Search Report dated Jun. 19, 2007 in related Application PCT/US2006/048753.

International Search Report dated Nov. 24, 2006 in PCT Application No. PCT/US2005/046797.

International Search Report in corresponding European Application No. 06256215.2, dated Feb. 20, 2007.

International Search Report in Patent Application No. PCT/US2006/048738 dated Jan. 29, 2008.

International Search report in Patent Application No. PCT/US2007/077020 dated Jan. 28, 2008.

International Search Report in Patent Application No. PCT/US2007/076889 dated Jan 28, 2008.

Invitation to Pay Additional Fees and Partial Search Report for corresponding PCT Application No. PCT/US2005/046797, dated Jul. 3, 2006.

iTunes, Wikipedia, the free encyclopedia; downloaded on Oct.5, 2005, pp. 1-6.

Jabra Bluetooth Headset User Manual: GN Netcom A/s, 2005.

Jabra Bluetooth Introduction; GN Netcom A/S, Oct. 2004.

Jabra FreeSpeak BT200 User Manual; Jabra Corporation, 2002.

Kennedy, "Digital Data Storage Using Video Disc," IBM Technical Disclosure Bulletin, vol. 24, No. 2, Jul. 1981.

Nonhoff-Arps, et al., "Straßenmusik Portable MP3-Spieler mit USB-Anschluss," CT Magazin Fuer Computer Technik, Verlag Heinz Heise GMBH, Hannover DE, No. 25, Dec. 4, 2000.

Nutzel et al., "Sharing Systems for Future HiFi System", The Computer Society, Jun. 2004.

Partial Search Report dated Sep. 6, 2007 in PCT Application No. PCT/US2007/004810.

Peter Lewis, "Two New Ways to Buy Your Bits," CNN Money, Dec. 31, 2003, pp. 1/4.

Sastry, Ravindra Wadali, "A Need for Speed: A New Speedometer for Runners", submitted to the Department of Electrical Engineering and Computer Science at the Massachusetts Institute of Technology, May 28, 1999.

Spiller, Karen. "Low-decibel earbuds keep noise at a reasonable level", The Telegraph Online, dated Aug. 13, 2006, http://www.nashuatelegraph.com/apps/pbcs.dll/article?Date=20060813&Cate . . . Downloaded Aug. 16, 2006.

U.S. Appl. No. 11/621,541, "Personalized Podcasting Podmapping" filed Jan. 9, 2007.

Waterproof Music Player with FM Radio and Pedometer Use Manual, Oregon Scientific, 2005.

Written Opinion dated Dec. 5, 2007 in PCT Application No. PCT/US2007/004810.

Written Opinion in Patent Application No. PCT/US2006/048738 dated Jan. 29, 2008.

Written Opinion in Patent Application No. PCT/US2007/076889 dated Jan. 28, 2008.

Written Opinion in Patent Application No. PCT/US2007/077020 dated Jan. 28, 2008.

Written Opinion of the International Searching Authority dated Nov. 24, 2006 in PCT Application No. PCT/US2005/046797.

Office Action Dated Feb. 1, 2008 in U.S. Appl. No. 11/327,544.

Hart-Daves, Guy, "How To Do Everything with Your IPod and Mini IPod Mini", 2004, McGraw-Hill Professional, p. 33.

Office Action Dated Feb. 4, 2008 in U.S. Appl. No. 11/566,072.

European Search Report dated Sep. 27, 2007 from European Application No. 05824296.7 (4 pages).

"Creative liefert erstes Portable Media Center aus" [Online ], Sep. 2, 2004, Retrieved from the internet on Sep. 20, 2007, http://www.golem.de/0409/33347 (2 pages).

Office Action dated Feb. 20, 2008 from Japanese Application No. 2007-538196 (13 pages).

IEEE 1394—Wikipedia, 1995, http://www.wikipedia.org/wiki/Firewire.

Office Action dated Sep. 19, 2008 in JP Application No. 2007-538196.

* cited by examiner

IMAGE SCALING ARRANGEMENT

CROSS-REFERENCE TO RELATED APPLICATIONS

This application is a continuation of U.S. patent application Ser. No. 10/973,657 entitled "IMAGE SCALING ARRANGEMENT" filed Oct. 25, 2004 that is, in turn, related to: (i) U.S. application Ser. No. 10/973,925 entitled "MULTIPLE MEDIA TYPE SYNCHRONIZATION BETWEEN HOST COMPUTER AND MEDIA DEVICE," FILED Oct. 25, 2004, which is hereby incorporated herein by reference; (ii) U.S. Provisional Application No. 60/622,304 Oct. 25, 2004, and entitled "WIRELESS SYNCHRONIZATION BETWEEN MEDIA PLAYER AND HOST DEVICE," which is hereby incorporated herein by reference; (iii) U.S. application Ser. No. 10/277,418, filed Oct. 21, 2002, and entitled "INTELLIGENT INTERACTION BETWEEN MEDIA PLAYER AND HOST COMPUTER," which is hereby incorporated herein by reference; and (iv) U.S. application Ser. No. 10/118,069, filed Apr. 5, 2002, and entitled "INTELLIGENT SYNCHRONIZATION OF MEDIA PLAYER WITH HOST COMPUTER," which are hereby incorporated herein by reference.

BACKGROUND OF THE INVENTION

1. Field of the Invention

The present invention relates to portable media devices and more particularly to data transfer with portable media devices.

2. Description of the Related Art

The hand-held consumer electronics market is exploding, and an increasing number of these products including for example PDAs, music players, cellular phones, cameras, and video games have increased their functionality to distance themselves from their competitors. By way of example, cellular phones have added PDA and camera functionality, PDAs have added cellular phone and music player functionality, music players have added PDA and video game functionality, etc. In the future, it is foreseeable that the functionality of all these devices will continue to merge into a single device. As these products evolve, it is believed that many design challenges will be encountered.

Many hand-held computing devices work hand in hand with a personal computer. The personal computer typically serves as a base to the portable hand-held computer device. For example, because they are hand-held, they are typically a portable extension of the personal computer. Like personal computers, these highly portable devices typically include a processor that operates to execute computer code and produce and use data in conjunction with an operating system. Unlike personal computers, however, these devices typically use less complex operating systems as well as smaller and less expensive processors that are slower than the processors used in personal computers. While this may be appropriate when the devices operate normally, difficulties arise when these hand-held computing devices are called upon to perform process intensive tasks. The difficulties include slow responsiveness and high power consumption. As a result, the user may be left with a negative user experience, i.e., users may not like a product that is slow and whose battery life is short.

Personal computers typically include software that helps manage the handheld computing devices. The personal computer may include for example a photo management program that helps transfer photos from the camera to the personal computer. The photo management program may also allow a user to sort, store and catalog their images as well as to provide touch-up capabilities such as red eye reduction, black and white conversion, image cropping and rotation. In some cases, the cameras modify the original image by embedding or storing thumbnail images inside the original image. The photo management program uses the embedded thumbnail images when importing the original image. For example, as each photo is being imported, the photo management program may show the thumbnail image thereby relaying to the user that the image is being imported.

In addition to photo management programs, the personal computer may also include music management programs that help transfer music from the personal computer to a music player such as an MP3 music player. Like the photo management program their music, the music management program may also allow a user to sort, modify, store and catalog their music. More particularly, the music program may give the user the ability to organize their music into playlists, edit file information, record music, download files to a music player, purchase music over the Internet (World Wide Web), run a visualizer to display the music in a visual form, and encode or transcode music into different audio formats such as MP3, AIFF, WAV, AAC, and ALE. Typically, music players only understand a single music format. Therefore, the music management program typically can to transcode the music stored in the personal computer from one music format to the desired music format of a music player.

In some cases, both the photo and music programs are linked so that the images and music stored therein can be played together. For example, the photo management program may allow a user to produce slide shows that show images to music. By way of example, the photo management program may correspond to iPhoto® and the music management program may correspond to iTunes®, both of which are manufactured by and available from Apple Computer Inc. of Cupertino, Calif.

Synchronization operations have been conventionally performed between portable devices, such as Personal Digital Assistants (PDAs) and host computers, to synchronize electronic files or other resources. For example, these files or other resources can pertain to text files, data files, calendar appointments, emails, to-do lists, electronic rolodexes, etc.

In the case of media players, such as MP3 players, files are typically moved between a host computer and a media player through use of a drag and drop operation, like is conventionally done with respect to copying of a data file from a Windows desktop to a floppy disk. Hence, the user of the media player can manually initiates synchronization for individual media items. As a consequence, synchronization tends to be tedious and time consuming for users. More recently, media players have been able to be synchronized with a host computer when a bus connection over a cable is made. Here, the synchronization can be automatically initiated when the cable is connected between the host computer and the media player. The iPod® offered by Apple Computer, Inc. of Cupertino, Calif. has the capability to provide such synchronization over a cable.

Thus, there is a continuing need for improved features for connecting and transferring data between media devices and their hosts.

SUMMARY OF THE INVENTION

The invention relates, in one embodiment, to a computing device. The computing device includes at least a data storage device for storing at least a plurality of media items, and a media management module configured to at least (i) receive a media request for at least one media item from a portable media device; (ii) obtain information regarding characteristics for the portable media device; (iii) obtain, based on the characteristics, a set of media items for each of the at least one media item being requested by the media request; and (iv) cause the set of media items to be sent to the portable media device.

The invention relates, in another embodiment, to a computing device. The computing device includes at least a data storage device for storing at least a plurality of media items, and a media management module configured to at least (i) pre-process a plurality of media items to produce a plurality of additional media items from each of the media items; (ii) store the additional media items in said data storage device; and (iii) deliver at least the additional media items to a portable media device.

The invention relates, in another embodiment, to a portable media device. The portable media device includes at least a data storage device configured to store media data pertaining to media items and to store device characteristics pertaining to said portable media device, an output device, and a processing device configured to (i) send at least a portion of the device characteristics to a host device, (ii) receive media data pertaining to one or more media items to be stored on said data storage device, the one or more media items having same or like media data, the received media data being obtained at the host device based on the device characteristics pertaining to said portable media device, (iii) storing the received media data to said data storage device, (iv) subsequently determining whether a particular media item of the one or more media items is to be output by said portable media device, (v) selecting an appropriate one of the determined media items to be output, and (vi) output the data for the selected determined media item.

The invention relates, in another embodiment, to a computer readable medium that stores computer program code for managing media items. The computer readable medium includes computer program code for receiving a media request for at least one media item from a portable media device, the media request including or referencing information regarding characteristics of the portable media device, computer program code for generating, based on the characteristics, a set of media items for each of the at least one media item being requested by the media request, the set of the media items generated from the at least one media item including a plurality of media items that have the same or like media data, and computer program code for sending the set of media items to the portable media device.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
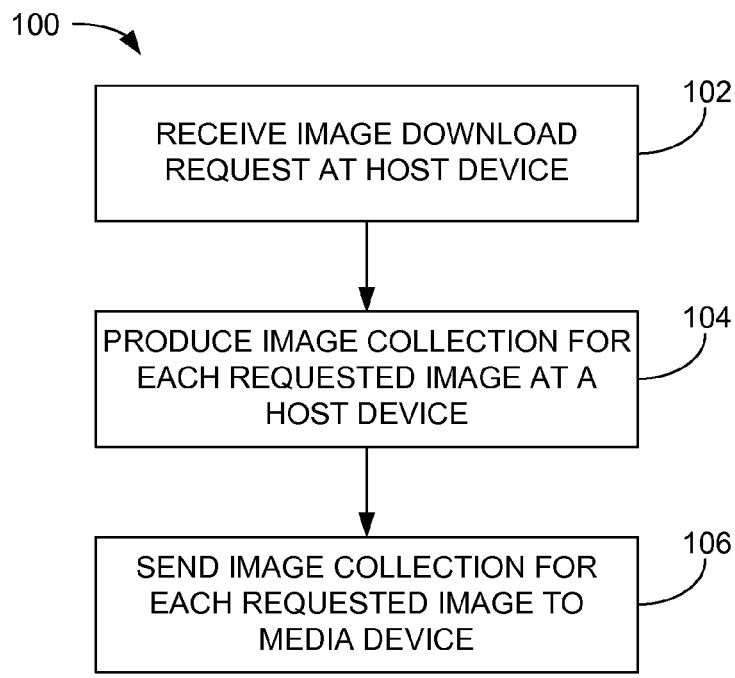
FIG. 1 is a method of transferring image data between a host device and a portable media device, in accordance with one embodiment of the present invention.

The present invention relates to portable media devices with image functionality and also to image transfer between portable media devices and their hosts. Media devices with image functionality typically require several different image formats to support the various display modes of the media device. For example, media devices typically require a full screen image that fills the entire display screen of the media device as well as various thumbnail images, which may help a user browse through a group of images.

One method for creating these various images is to download the original image to the portable media device and then to transcode the original image into the required formats on the portable media device when they need to be displayed. This is sometimes referred to as processing data on-the-fly. While this may work, it is generally believed that this methodology has several drawbacks that make it less appealing to the user. For example, because formatting images is a process intensive task (especially on portable media devices that lack the horsepower of their larger hosts), portable media devices tend to operate slowly and consume more power. Hence, formatting images on portable media devices tend to result in an unsatisfactory user experience. For one, the user has to wait while the image is being formatted. For another, the battery of the portable media device tends to run out more regularly.

In order to overcome these drawbacks, the present invention provides a method where images are preformatted on the host before or during the download thereto. When an image is identified for download various preformatted images derived from the original image (and possibly the original images) are sent to the portable media device. The processing is performed on the host, which can handle these tasks more easily than the portable media player. The tasks may, for example, include scaling, cropping, rotation, color correction and the like. Once received by the portable media device, the preformatted images and possibly the original image are stored for later use. By storing these images, the media device is relieved from having to perform any of the labor intensive tasks associated with image formatting. That is, the preformatted images relieve the media device of much of the work required to display them. As a result, the device operates faster and without repeated needs for recharging. In one embodiment, at least some of the preformatted images are thumbnail images.

During media device use, a user may request that an image be displayed. Instead of processing the original image as in the method described above, the device simply obtains the appropriate preformatted image from storage and presents it to the user on a display. The preformatted images may include a full screen image and several different thumbnail sized images. The full screen image typically depends on the size of the display contained in the portable media device, i.e., the full screen image generally fills the entire screen. The different sized thumbnail images, which come in various sizes, may be used in a variety of ways including separately or together. For example, a plurality of smaller thumbnails may be grouped together so that a user can quickly browse through a large number of images. The preformatted images may also follow formats associated with standards or other devices to which the portable media device can be linked. For example, at least one the preformatted images may be based on television formats so that the portable media device can present images on televisions (TVs). The TV formats may, for example, include NTSC, PAL, HDTV, and the like. The formats may also be based on formats associated with printers, cameras or similar image using devices.

In some cases, the media device when connected to a host expresses or informs the host as to which image formats are desired when an image is downloaded to the media device. The media device may, for example, send various image profiles corresponding to the different formats to the host device. The image profile generally contains the attributes or keys for each image format. By way of example, the image profiles may describe size, orientation, pixel format, color depth, etc. for each image format. This particular methodology helps with compatibility issues that typically come up when different media devices having different versions of software and hardware are used, i.e., the version of the software/hardware is made irrelevant since the media device expresses what information it wants from the host device.

Embodiments of the invention are discussed below with reference to FIGS. 1-1F. However, those skilled in the art will readily appreciate that the detailed description given herein with respect to these figures is for explanatory purposes as the invention extends beyond these limited embodiments.

FIG. 1 is a method 100 of transferring image data between a host device and a portable media device, in accordance with one embodiment of the present invention. The method 100 may, for example, be performed by media management software. The method includes blocks 102, 104 and 106. In block 102, an image download request is received at the host device. The image download request designates at least one image stored on the host device for downloading to the portable media device. In some cases, only a single image is requested and in other cases a plurality of images are requested. The request can be made at the host device or the media device through a user interface. For example, the user may select a group of images and then select a download button. Alternatively, the request can be made by the media device without user input.

In block 104, an image collection for each requested image is produced at the host device. Each image collection contains the new versions or different formats of the original image. In some cases, the image collection may also contain the original image. For example, the new versions may include a full screen image, which corresponds to the screen size on the media player, various thumbnail images, each of which are typically smaller versions of the original image, as well as various other images including for example TV images. It should be noted that the file sizes of the new versions are typically much smaller than the file size of the original image. They therefore take up less space in storage than would the corresponding original image.

Each new version has a different image profile based on the display needs of the portable media device. The image profiles for particular media devices may be stored in the host device or the image profiles may be given to the host device by the media device. In the first case, the media device may provide the host device with an Identifier (ID), which can be used by the host to determine the image profiles for the requesting media device. For example, after obtaining the ID the host may refer to a previously stored table or list that includes all the capabilities of the identified media device. In the later case, the media device may automatically upload this information as part of synchronization or handshaking procedure with the host device.

The image profile generally includes a list of keys or attributes which define the qualities or characteristics of each image. The keys or attributes may include for example FormatID, RenderWidth, RenderHeight, DisplayWidth, DisplayHeight, PixelFormat, Sizing, BackColor, Rotation, ScanFormat, ColorAdjustment, GammaAdjustment, and the like.

FormatID refers to an identification number that defines the image profile. Changing any of the attributes within the image profile will change the identification number. The media management program uses this ID to identify thumbnail locations in both the host and media devices.

RenderWidth is the width of the image in pixels at render time. RenderHeight is the height of the image in pixels at render time. RenderWidth and RenderHeight generally refers to actual physical size.

DisplayWidth is the width of the image in pixels at display time. DisplayHeight is the height of the image in pixels at display time. It should be noted that DisplayHeight and DisplayWidth can differ from RenderHeight and RenderWidth in those cases like NTSC where the pixels are not square. DisplayWidth and DisplayHeight generally refer to the true size.

PixelFormat describes information encoded in each pixel (e.g., color components (RGB), transparency, etc.). Several formats can be used including, for example, the QuickDraw/QuickTime pixel format.

Sizing describes what happens if the original image is smaller than the desired thumbnail. By way of example, if 0, scale the image to the desired height/width. If 1, scale the image to the desired height/width only if the image is larger than RenderWidth or RenderHeight, i.e., don't scale small images. If 2, center-crop the image to the desired height/width rather than scaling it.

BackColor describes what color the background should be in cases where the images don't fill the entire viewing area. The background color may be in big-endian ARGB format as a hexadecimal string.

Rotation described if and how an image should be rotated. The image rotation is typically in degrees. For example, the rotation values may be 0, 90, 180 and 270.

ScanFormat designates what scan format the image is stored in ImageFormat may include progressive format or interlace format.

ColorAdjustment describes whether or not a color adjustment is needed, and if needed what the color adjustment should be. By way of example, if 0, no color adjustment is applied. If 1, NTSC color adjustment is applied. If 2, PAL color adjustment is applied.

GammaAdjustment describes whether a gamma correction needs to be applied to the image (e.g., brightness). If not supplied, no correction is done.

In block 106, the image collection for each requested image is sent to the portable media device as part of the downloading process. Once received by the portable media device, the image collection is stored in the portable media device for later use. The image collection may be stored in the memory of the portable media device. In order to efficiently store the images in memory, each of the different image sets may be stored in their own file. That is, images having the same image profile are grouped in the same file. For example, the original images may be stored in a first file, the full screen images may be stored in a second file, a first set of thumbnail images may be stored in a third file, a second set of thumbnail images may be stored in a fourth file, the TV images may be stored in a fifth file and so on.

It should be noted that in some cases, the original image may not be sent to or stored on the hand held media device. This may be done to save valuable storage space on the hand held media devices that typically have limited storage capacity. As should be appreciated, the file size of the original image is typically much larger than the thumbnail images and therefore they can take up more space in memory. The decision of whether to include the original image with the rest of the images may be made by the user. For example, the user may be presented with a choice as whether they desire or do not desire to download or store the original image. This decision may be based on how the user uses the media device. For some, the media device may be used to transfer images from one host to another. In cases such as these, the user typically wants to include the original image. The decision may be set for all downloads or it may be made at each down load request. Similarly, the same decision can be made for all the different formats if so desired (as some of these formats may not be needed).

Once downloaded and during operation of the media device, a display request may be made on the media device. Thereafter, one or more images are retrieved from memory based on the display request. The display request indicates the images to be shown on the media player and/or images that are to be sent to another device connected to the media device. Once retrieved, the images can be displayed. The manner in which the images are displayed are typically determined by the mode of the media device. The modes can include a browse mode, a slide show mode, a full screen mode, etc. In browse mode, a plurality of tiny thumbnail images are displayed in rows and columns. In a slide show mode, a medium thumbnail image may be displayed in the center and smaller thumbnail images may be displayed on either side of the medium thumbnail image. The small image to the left of the medium image may represent a previously shown image, the medium image may represent the current image being shown, and the small image to the left of the medium image may represent the next image in the slide show sequence. If a TV is connected to the media device, the media device may output the TV version of the current image being shown to the TV. In a full screen mode, the full screen image is displayed.

Figure 2:
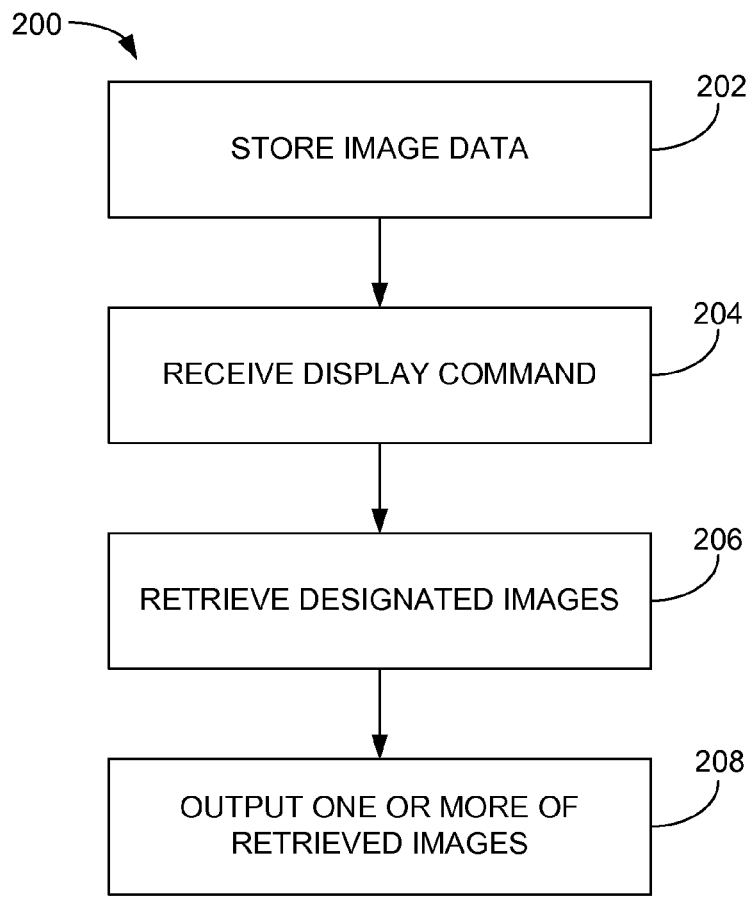
FIG. 2 is an operational method for a portable media device, in accordance with one embodiment of the present invention.

FIG. 2 is an operational method for a portable media device 200, in accordance with one embodiment of the present invention. The method includes blocks 202, 204, 206 and 208. In block 202, image data is stored. The image data includes at least a plurality of image collections. The image collections contain a plurality of differently formatted images based on an original image and may also include the original image. The image collections are not formed on the portable media device. They are separately generated on a device other than the portable media device. The image collections may for example be generated on a host device that downloads them to the portable media device for storage. By way of example, the image collections may be provided by the method described in FIG. 1. Alternatively or additionally, the image collections may be downloaded from another portable media device that has already downloaded them from a host.

In block 204, a display command is received. The display command designates one or more images of the image data to be displayed. The display command may be generated via a user making a selection on the user interface of the media player.

In block 206, at least the designated images are retrieved. In some cases, only the designated images are retrieved. In other case, more than the designated images are retrieved. For example, although the display command may only designate a single image, other images associated or linked to that image may be additionally retrieved.

In block 208, the one or more retrieved images are outputted. The retrieved images may be outputted to a display. The display may be located on the portable media device or it may be located external to the portable media device. In either case, upon receiving the retrieved images, the retrieved images are displayed. IN some cases, all of the images are displayed, and in other case only a portion of the images are displayed. The later case may be implemented when the size and number of images is greater than the screen size.

Figure 3:
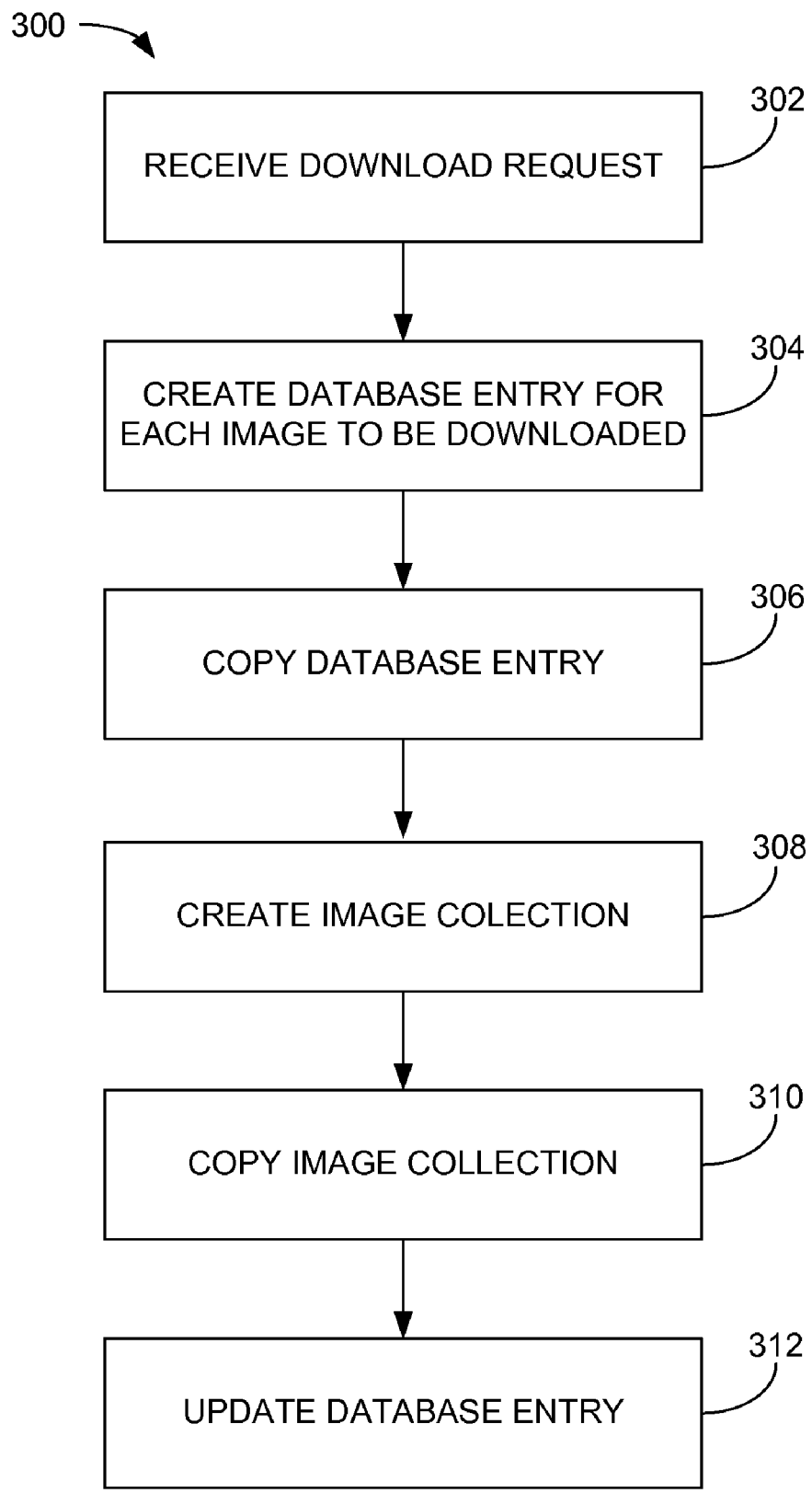
FIG. 3 is a method of transferring image data between a host device and a portable media device, in accordance with one embodiment of the present invention.

FIG. 3 is a method 300 of transferring image data between a host device and a portable media device, in accordance with one embodiment of the present invention. The method may for example be performed by a media management program operating on the host device. The method begins at block 302 where a down load request is received. The download request designates one or more images to be downloaded from the host device to the portable media device. The download request is typically implemented via a user selection, i.e., a user selects one or more images and initiates a downloading procedure.

Following block 302, the method proceeds to block 304 where a database entry is created for each image to be downloaded. The database entry provides information about the images to be downloaded. The information may for example be metadata. Following block 304, the method proceeds to block 306 where the database entry is written or copied on the media device. The database entry is typically copied to an image database on the media device. If an image database does not exist, one will typically be created. If one does exist, the database entry will be copied thereto.

Also following block 304, the method proceeds to block 308 where an image collection is created on the host. This may include transcoding new versions of the selected image based on a plurality of image profiles, and grouping the new versions of the original image and in some cases the original image into an image collection. The image profiles define the features of the new images. By way of example, the image profiles may include keys for making thumbnails and other images such as those which can be used on TV, printers, and other media devices (e.g., camera). The image profiles may be supplied to the host device by the media device, and thereafter stored locally on the host device. This may be part of the synchronization procedure that occurs between the host device and media device when they are connected together.

Following block 308, the method proceeds to block 310 where each image in the image collection is written or copied to the media device. That is, each new version of the original image and in some cases the original image are copied to the media device. In one embodiment, each particular type of image is stored in a separate file on the media device. For example, all of the originals are stored in an original image file, all of a first thumbnails are stored in a first thumbnail image file, and so on.

Following block 310, the method proceeds to block 312 where the database entry is updated. That is, the database entry is filled with the appropriate image data. The step of updating typically includes grouping together all the images of a particular image collection (original, thumbnails, TV), and providing pointers to the location where the actual image is stored (e.g., image files).

It should be noted that in most cases the host device stores a copy of the database entry and image collections in parallel with the media device.

It should be noted that the all or some of the steps mentioned above can occur separately as distinct events or they can occur simultaneously. In the later case, at least some of the steps can be interleaved. In interleaving, while some images are being copied, other images are being created. Interleaving is generally preferred in order to reduce the amount of time needed for downloading.

The image data stored in the media device will now be described. As mentioned above the image data is spread among multiple files. The main image database file holds image metadata, photo album lists, and "pointers" to the original image as well as all available thumbnails. The images themselves are stored either as individual files (originals) or in image set files, which contain one or more thumbnails of the same type. This is typically done to save storage space. It should be noted, however, that this is not a limitation and that the images may be stored as an image collection rather than in separate files.

In one embodiment, the photo database file contains a header followed by several "sections." The number of sections can be widely varied although it is expected that the photo database will contain three sections: image list section, album list section and the image record ID table. The image list section contains a list of all images stored on the media device. Each image entry contains all of the metadata for an image as well as a list of locations for all available images associated therewith including the original, thumbnails and TV. Each image has a unique persistent record ID which is used in both the album and record ID table sections. The album list section contains a list of the albums, each of which is simply an ordered list of image record IDs. The image record ID table is a table containing record IDs and file offsets for all images, sorted in ascending record ID order. This table allows the media device to quickly load only those image records for a given album, rather than requiring loading the whole image record list.

The images themselves are stored in image set files. Each image set file contains a file header, followed by one or more images, each with a header. This allows scavenging of the data should the need arise. The image records in the photo database are by file specification (path) and file offset, so it is not necessary to parse an image set file to get to a particular image. The number of images per file and/or the maximum image files size may be widely varied. By way of example, the maximum size may be 500 Megabytes.

The following is an exemplary layout for the photo database stored on the media device:

File header
    Image List Section Header
        Image List header
            Image 1 metadata
                Image 1 Original Image Location
                Image 1 Thumbnail 1 Image location
                <additional image locations>

-continued

Image 2 Metadata
                Image 2 Original Image Location
                Image 2 Thumbnail 1 Image location
                <additional image locations>
            <additional images>
    Album List Section Header
        Album 1 Metadata
            Album 1 Image Record ID 1
            Album 1 Image Record ID 2
            <additional album images>
        Album 1 Metadata
            Album 1 Image Record ID 1
            Album 1 Image Record ID 2
            <additional album images>
        <additional albums>
    Record ID List Section Header
        Record ID List Header
            Record ID 1 Description
            Record ID 2 Description
            <additional record Ids>

The following is an exemplary layout for an image set file stored on the media device:

File Header
    Image 1 Header
        Image 1 Data
    Image 2 Header
        Image 2 Data
    <additional images>

Figures 4, 5A, 5B, 5C, 5D, 5E, 5F:
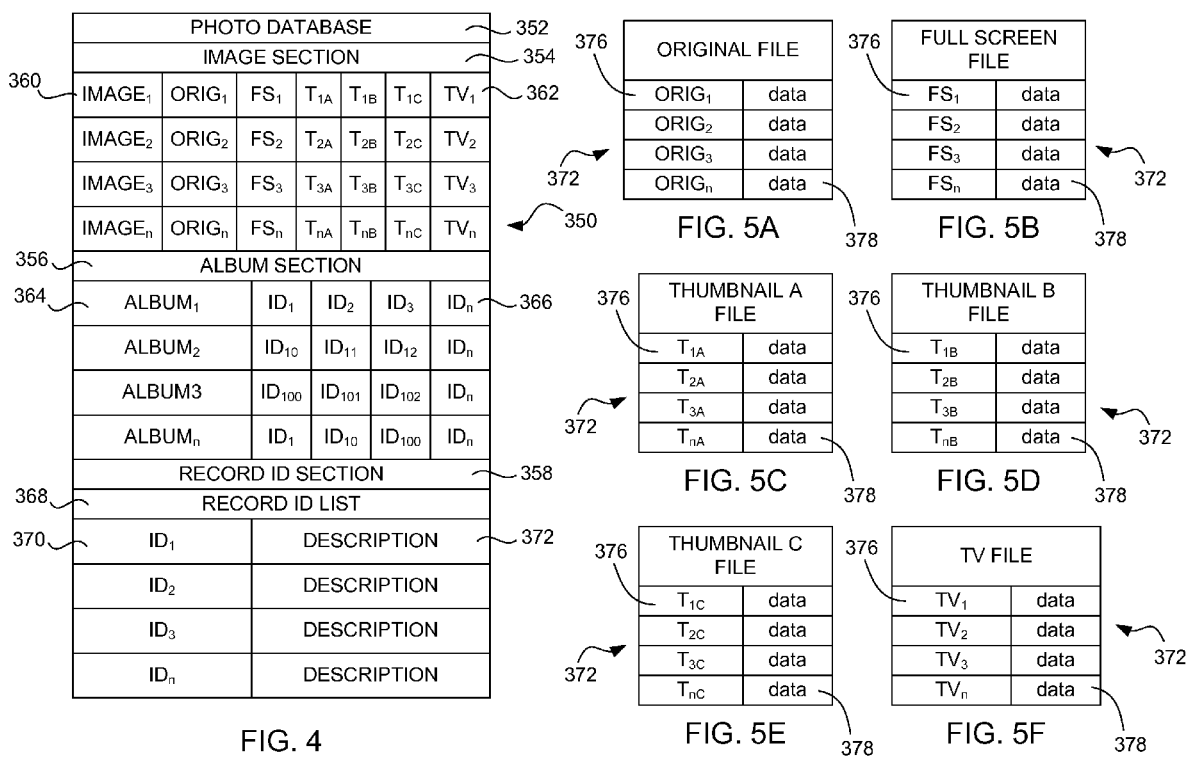
FIG. 4 is an exemplary diagram of a photo database file, in accordance with one embodiment of the present invention.
FIGS. 5A-5F are diagrams of image set files, in accordance with several embodiments of the present invention.

FIG. 4 is an exemplary diagram of a photo database file 350, in accordance with one embodiment of the present invention. The photo database 350 includes a file header 352, an image list section header 354, an album list section header 356 and a record ID list section header 358. Inside the images list section header 354 are image entries 360, and pointers 362, which provide image locations for the various images in the image entry including for example the original image O and a plurality of thumbnails T thereof. Inside the album list section header 356 are album entries 364 and record IDs 366 for each of the images in the album. Inside the record ID list section header 358 are Record ID list header 368 and record ID descriptions 370.

FIGS. 5A-5E are diagrams of exemplary image set files 372, in accordance with one embodiment of the present invention. FIG. 5A is a diagram of an original image set file 372A, FIG. 5B is a diagram of a tiny thumbnail set file 372B, FIG. 5C is a diagram of a small thumbnail set file 372C, FIG. 5D is a diagram of a medium thumbnail set file 372D, FIG. 5E is a diagram of a full screen image set file 372E, and FIG. 5F is a diagram of a TV screen image set file 372F. In each of these figures, the image set files 372 include a file header 374, image headers 376 and the actual image data 378.

Figure 6:
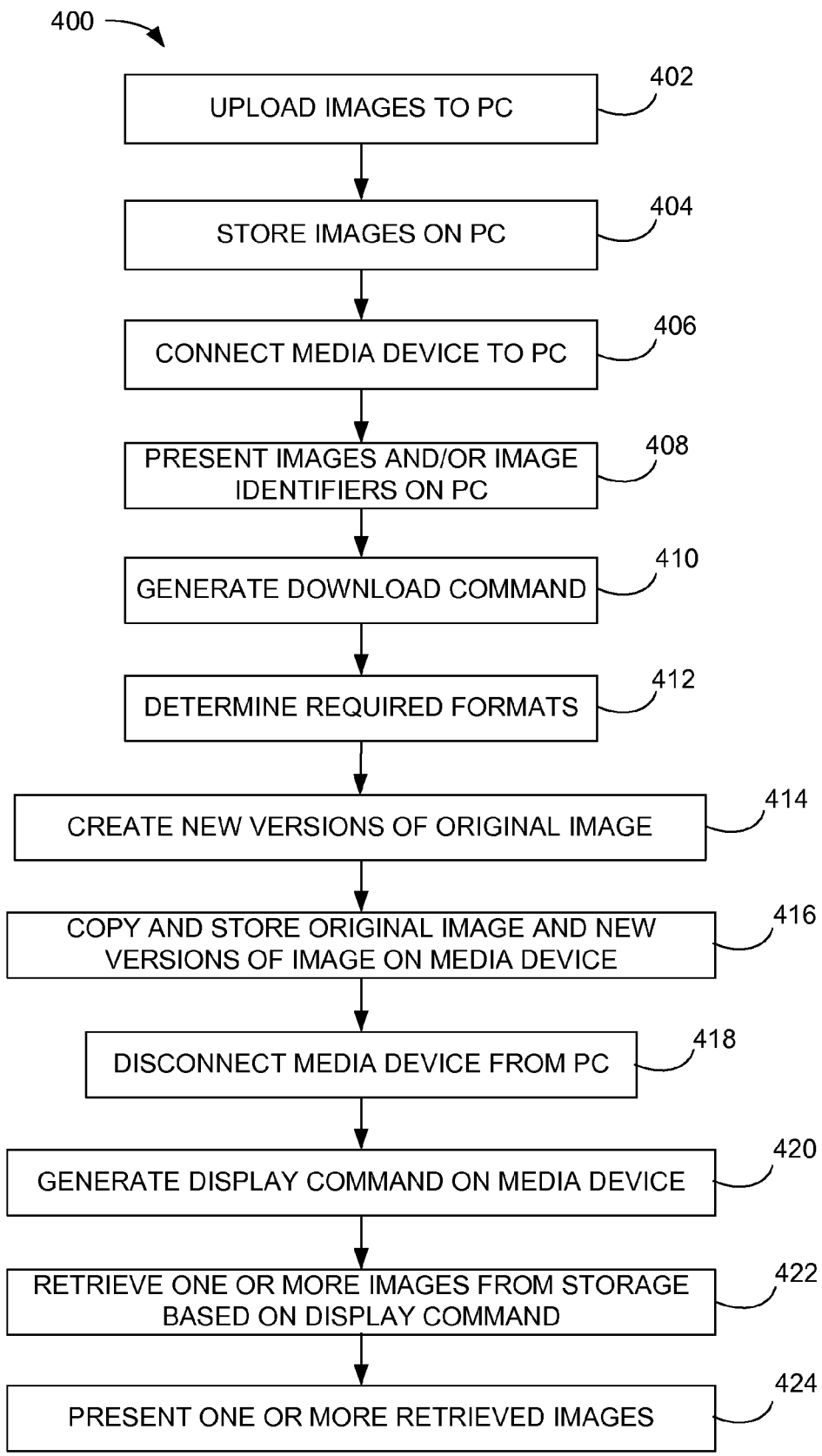
FIG. 6 is media method, in accordance with one embodiment of the present invention.

FIG. 6 is media method 400, in accordance with one embodiment of the present invention. The method may be performed on a media system including a host device such as a personal computer and a media device. The method begins at block 402 where one or more images are uploaded into a personal computer. The images may be uploaded from a camera, memory device, Internet or the like. After block 402, the method proceeds to block 404 where the images are stored in the personal computer. Blocks 402 and 404 may be accomplished with a media management program. In Block 406, a media player is connected to the personal computer. This may be accomplished through a wired or wireless connection. The connection may include a handshaking and/or synching procedure.

In some cases, the media management program is automatically opened when the two devices are connected. The particular media management program opened may depend on the type of media device. If the media device is a music player, the media management program may be a music program. If the media device is a photo player, the media management program may be an image program. If the media device is a combination music/photo player, the media management program may be music program or a photo program or a combination of the two. If the different programs are operated independently, the music program and the photo program may be linked so that information can be shared there between. For example, the music program may be able to access data from the photo program and vice versa.

In block 408, images and/or image identifiers (e.g., text) are presented on the personal computer. This too may be accomplished with the media management program. In fact, the images and image identifiers may be included in a photo window associated with a graphical user interface. In block 410, a download command is generated. The download command designates one or more images to be downloaded from the personal computer to the portable media device. The download command may be generated when a user selects one or more images and hits a download feature located in the photo window.

In block 412, the image formats required by the portable media device are determined. The determination may be made before the download or it may be made as part of the downloading process. In some cases, the host device stores a list of required formats for a variety of media devices. In other cases, the portable media device supplies the personal computer with required formats and image profiles, which describe how to format each image. In block 414, new versions of the original image are created. That is, using the image profiles, the personal computer transcodes the original image into differently formatted images based on the image profile. By way of example, the transcoding may be performed by a multimedia technology such as QuickTime of Apple Computers Inc. of Cupertino, Calif. QuickTime is a powerful, cross platform, multimedia technology for manipulating, enhancing, and storing video, sound, animation, graphics, text, music, and the like. In Block 416, the new versions of the original image and in some cases the original image are copied and stored onto the media device.

In block 418, the media device is disconnected from the personal computer thereby allowing the images to be transported via the portable media device. In block 420, a display command is generated on the media device during transport. In block 422, one or more images are retrieved based on the display command. In block 424, at least one of the retrieved images is presented. The retrieved image can be any of the stored images including the original and/or the new images. The retrieved image can be presented on the portable media device as for example though an LCD and/or it can be presented on an external display such as a television.

Figure 7:
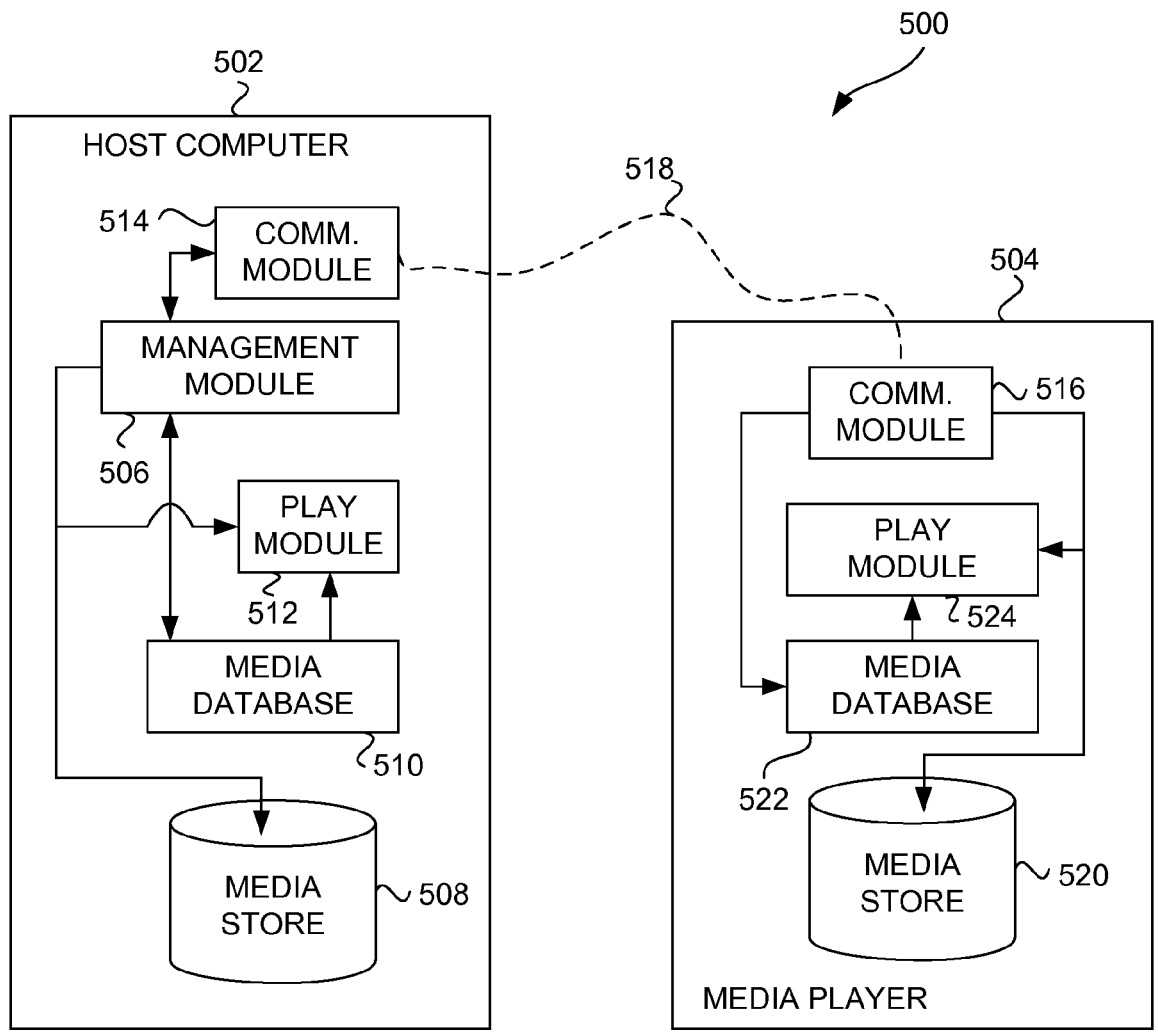
FIG. 7 is a block diagram of a media management system, in accordance with one embodiment of the present invention.

FIG. 7 is a block diagram of a media management system 500, in accordance with one embodiment of the present invention. The media management system 500 includes a host computer 502 and a media player 504. The host computer 502 is typically a personal computer. The host computer, among other conventional components, includes a management module 506, which is a software module. The management module 506 provides for centralized management of media items not only on the host computer 502 but also on the media player 504. More particularly, the management module 506 manages those media items stored in a media store 508 associated with the host computer 502. The management module 506 also interacts with a media database 510 to store media information associated with the media items stored in the media store 508.

The media items may correspond to audio, images or video items. The media information, on the other hand, pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time, etc.

Still further, the host computer 502 includes a play module 512. The play module 512 is a software module that can be utilized to play certain media items stored in the media store 508. The play module 412 can also utilize media information from the media database 510. Typically, the media information of interest corresponds to the media items to be played by the play module 512.

The host computer 502 also includes a communication module 514 that couples to a corresponding communication module 416 within the media player 504. A connection or link 518 removably couples the communication modules 514 and 416. In one embodiment, the connection or link 518 is a cable that provides a data bus, such as a FIREWIRE™ bus or USB bus, which is well known in the art. In another embodiment, the connection or link 518 is a wireless channel or connection through a wireless network. Hence, depending on implementation, the communication modules 514 and 516 may communicate in a wired or wireless manner.

The media player 504 also includes a media store 520 that stores media items within the media player 504. The media items being stored to the media store 520 are typically received over the connection or link 518 from the host computer 502. More particularly, the management module 506 sends all or certain of those media items residing on the media store 508 over the connection or link 518 to the media store 520 within the media player 504. Additionally, the corresponding media information for the media items that is also delivered to the media player 504 from the host computer 502 can be stored in a media database 522. In this regard, certain media information from the media database 510 within the host computer 502 can be sent to the media database 522 within the media player 504 over the connection or link 518. Still further, lists identifying certain of the media items can also be sent by the management module 506 over the connection or link 518 to the media store 520 or the media database 522 within the media player 504.

Furthermore, the media player 504 includes a play module 524 that couples to the media store 520 and the media database 522. The play module 524 is a software module that can be utilized to play certain media items stored in the media store 520. The play module 524 can also utilize media information from the media database 422. Typically, the media information of interest corresponds to the media items to be played by the play module 524.

Hence, in one embodiment, the media player 504 has limited or no capability to manage media items on the media player 504. However, the management module 506 within the host computer 502 can indirectly manage the media items residing on the media player 504. For example, to "add" a media item to the media player 504, the management module 506 serves to identify the media item to be added to the media player 504 from the media store 508 and then causes the identified media item to be delivered to the media player 504. As another example, to "delete" a media item from the media player 504, the management module 506 serves to identify the media item to be deleted from the media store 508 and then causes the identified media item to be deleted from the media player 504. As still another example, if changes (i.e., alterations) to characteristics of a media item were made at the host computer 502 using the management module 506, then such characteristics can also be carried over to the corresponding media item on the media player 504. In one implementation, the additions, deletions and/or changes occur in a batch-like process during synchronization of the media items on the media player 504 with the media items on the host computer 502.

In another embodiment, the media player 504 has limited or no capability to manage playlists on the media player 504. However, the management module 506 within the host computer 502 through management of the playlists residing on the host computer can indirectly manage the playlists residing on the media player 504. In this regard, additions, deletions or changes to playlists can be performed on the host computer 502 and then by carried over to the media player 404 when delivered thereto.

As previously noted, synchronization is a form of media management. The ability to automatically initiate synchronization was also previously discussed. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 8:
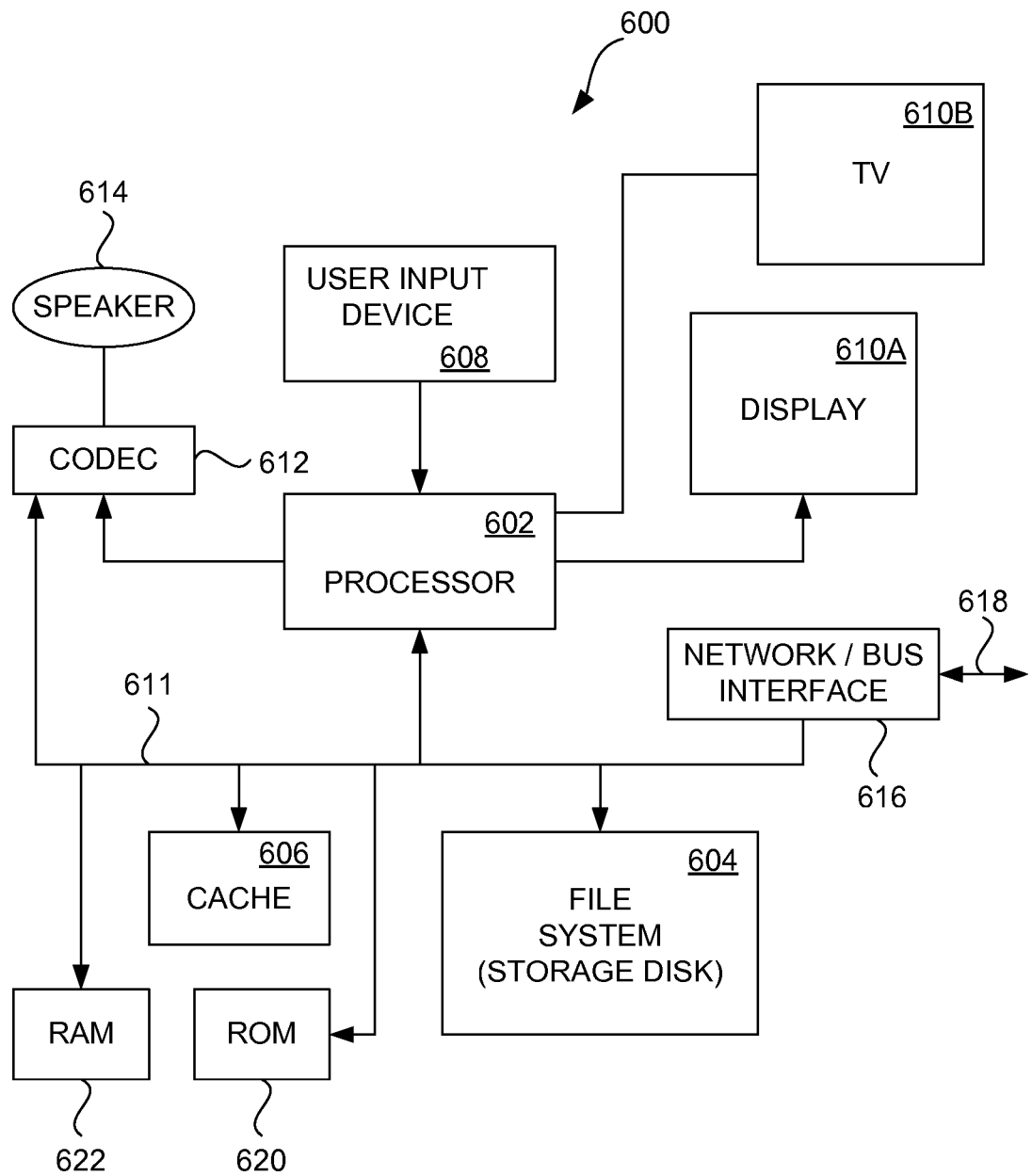
FIG. 8 is a block diagram of a media player, in accordance with one embodiment of the present invention.

FIG. 8 is a block diagram of a media player 600, in accordance with one embodiment of the present invention. The media player 600 includes a processor 602 that pertains to a microprocessor or controller for controlling the overall operation of the media player 600. The media player 600 stores media data pertaining to media items in a file system 604 and a cache 606. The file system 604 is, typically, a storage disk or a plurality of disks. The file system 604 typically provides high capacity storage capability for the media player 600. However, since the access time to the file system 604 is relatively slow, the media player 600 can also include a cache 606. The cache 606 is, for example, Random-Access Memory (RAM) provided by semiconductor memory. The relative access time to the cache 606 is substantially shorter than for the file system 604. However, the cache 506 does not have the large storage capacity of the file system 604. Further, the file system 504, when active, consumes more power than does the cache 606. The power consumption is often a concern when the media player 600 is a portable media player that is powered by a battery (not shown). The media player 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The media player 600 also includes a user input device 608 that allows a user of the media player 600 to interact with the media player 600. For example, the user input device 608 can take a variety of forms, such as a button, keypad, dial, etc. Still further, the media player 600 includes a display 610 (screen display) that can be controlled by the processor 602 to display information to the user. A data bus 611 can facilitate data transfer between at least the file system 604, the cache 606, the processor 602, and the CODECs 612.

In one embodiment, the media player 600 serves to store a plurality of media items in the file system 604. The media items may for example correspond to audio (e.g., songs, books), images (e.g., photos) or videos (e.g., movies). When a user desires to have the media player play a particular media item, a list of available media items is typically displayed on the display 610. Then, using the user input device 608, a user can select one of the available media items. The processor 602, upon receiving a selection of a particular media item, supplies the media data (e.g., audio file, image file or video file) for the particular media item to the appropriate device. For audio items, the processor supplies the media item to a coder/decoder (CODEC) 612. The CODEC 612 then produces analog output signals for a speaker 614. The speaker 614 can be a speaker internal to the media player 600 or external to the media player 600. For example, headphones or earphones that connect to the media player 600 would be considered an external speaker.

For visual items, the processor supplies the media item to the display 610. The display may for example be a liquid crystal display (LCD) that is integral with the media player. Alternatively, the display may be an external display such as a CRT or LCD, or a television of any particular type. In some cases, the processor is configured to supply media data to both an integrated display and an external display. In cases such as this, the media data displayed on both displays may be the same of it may be different. In the later case, for example, the internal display may include a slide show interface showing the previous image, the next image and the image currently being displayed on the external display.

The media player 600 also includes a network/bus interface 616 that couples to a data link 618. The data link 618 allows the media player 600 to couple to a host computer. The data link 618 can be provided over a wired connection or a wireless connection. In the case of a wireless connection, the network/bus interface 616 can include a wireless transceiver.

In another embodiment, a media player can be used with a docking station. The docking station can provide wireless communication capability (e.g., wireless transceiver) for the media player, such that the media player can communicate with a host device using the wireless communication capability when docked at the docking station. The docking station may or may not be itself portable.

The wireless network, connection or channel can be radio-frequency based, so as to not require line-of-sight arrangement between sending and receiving devices. Hence, synchronization can be achieved while a media player remains in a bag, vehicle or other container.

The host device can also be a media player. In such case, the synchronization of media items can between two media players.

The various aspects, embodiments, implementations or features of the invention can be used separately or in any combination.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

Figure 9:
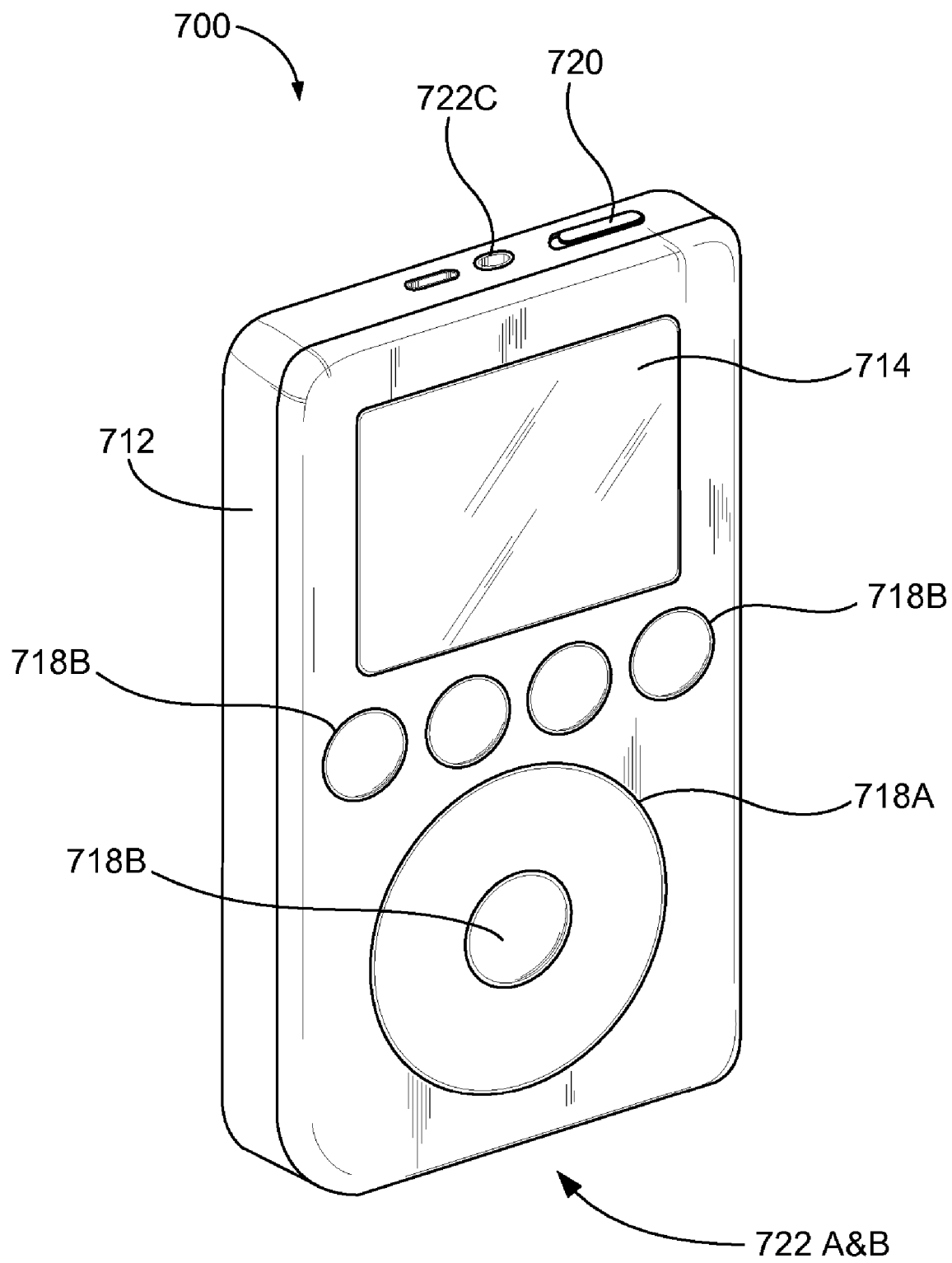
FIG. 9 is perspective view of a handheld computing device, in accordance with one embodiment of the present invention.

FIG. 9 is perspective view of a handheld computing device 700, in accordance with one embodiment of the present invention. The computing device 700 is capable of processing data and more particularly media such as audio, video, images, etc. By way of example, the computing device 700 may generally correspond to a music player, game player, video player, camera, cell phone, personal digital assistant (PDA), and/or the like. With regards to being handheld, the computing device 700 can be operated solely by the user's hand(s), i.e., no reference surface such as a desktop is needed. In some cases, the handheld device is sized for placement into a pocket of the user. By being pocket sized, the user does not have to directly carry the device and therefore the device can be taken almost anywhere the user travels (e.g., the user is not limited by carrying a large, bulky and heavy device).

As shown, the computing device 700 includes a housing 712 that encloses and supports internally various electrical components (including integrated circuit chips and other circuitry) to provide computing operations for the device. The integrated circuit chips and other circuitry may include a microprocessor, memory, a battery, and various input/output (I/O) support circuitry. In most cases, the microprocessor executes instructions and carries out operations associated with the computing device. For example, using instructions retrieved for example from memory, the microprocessor may control the reception and manipulation of input and output data between components of the computing device 700. In fact, the microprocessor may work with an operating system to execute computer code and produce and use data stored in memory. By way of example, the memory may include a hard drive, flash memory, Read-Only Memory (ROM), Random-Access Memory (RAM) and/or the like.

The computing device 700 also includes a display 714. The display 714, which is assembled within the housing 712 and which is visible through an opening in the housing 712, is used to display a graphical user interface (GUI) as well as other information to the user (e.g., text, objects, graphics). The display 714 generally takes the form of a flat panel display such as a liquid crystal display (LCD).

The computing device 700 also includes one or more input devices 718 configured to transfer data from the outside world into the computing device 700. The input devices 718 may for example be used to perform tracking/scrolling, to make selections or to issue commands in the computing device 700. By way of example, the input devices 718 may correspond to keypads, joysticks, touch screens, touch pads, track balls, wheels, buttons, switches, and/or the like. In the illustrated embodiment, the computing device 700 includes a touch pad 718A and a plurality of buttons 718B, which are assembled within the housing 712 and which are accessible through openings in the housing 712.

The computing device 700 may include one or more switches 720 including power switches, hold switches, and the like. Furthermore, the device 700 may include one or more connectors 722 including data ports and power terminals 722A and B, as well as audio and/or video jacks 722C.

In the illustrated embodiment, the computing device 700 is a pocket sized hand held music/photo player that allows a user to store a large collection of music and photos, and to listen to this music and view the photos on the go (e.g., while working, traveling, exercising, etc.). In such a case, the memory may contain media management software having both music playing and photo displaying capabilities. Furthermore, the GUI may visually provide music and photo menus, as well as music and photo controls to the user. Moreover, the touch pad may provide scrolling functions, which allow a user to traverse through menus or controls on the GUI as well as to browse through a list of songs or photos, and the buttons may provide button functions that open a menu, play a song, display a photo, fast forward through a song, seek through a playlist or album and/or the like. In addition, the music/photo player typically includes an audio jack for outputting audio, a video jack for outputting photos and videos and a data port for transmitting and receiving media data (and other data.) to and from a host device. In some cases, the audio and video jack are combined into a single jack. By way of example, the music photo player may correspond to the iPod® series music players manufactured by Apple Computer of Cupertino, Calif.

Figure 10:
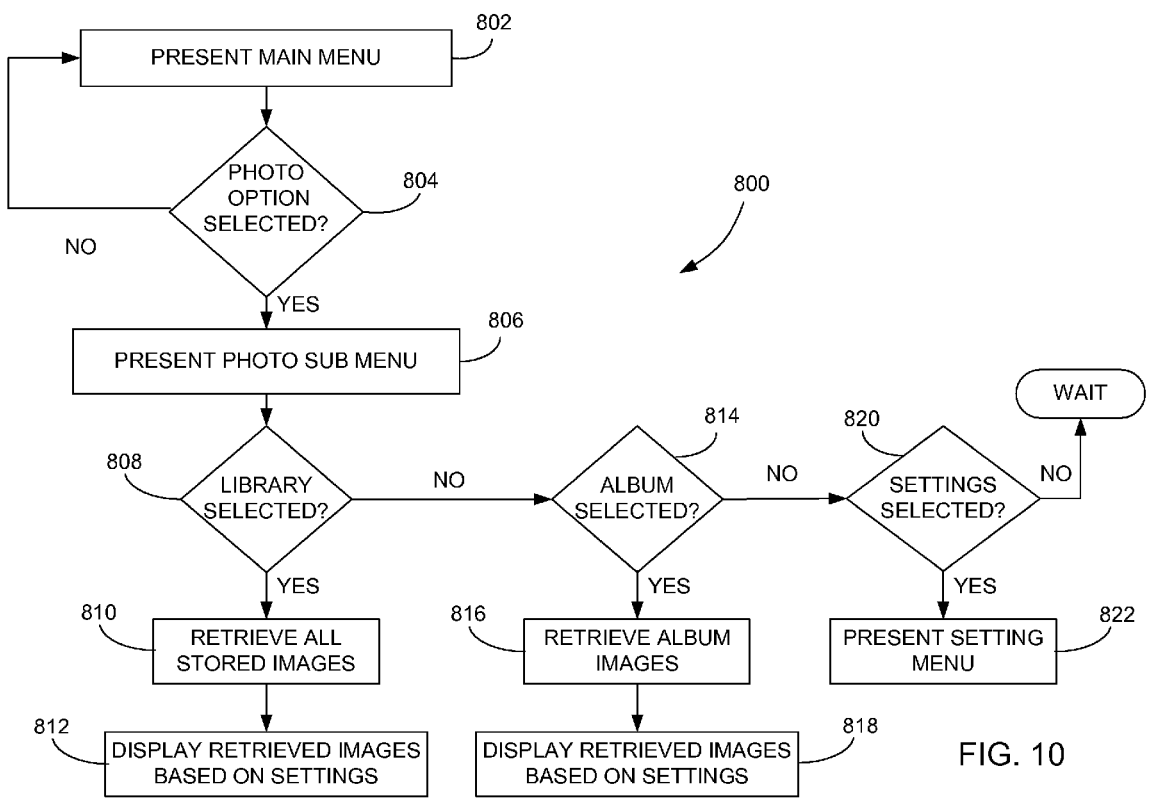
FIG. 10 is a media device operational method, in accordance with one embodiment of the present invention.
Figure 11A:
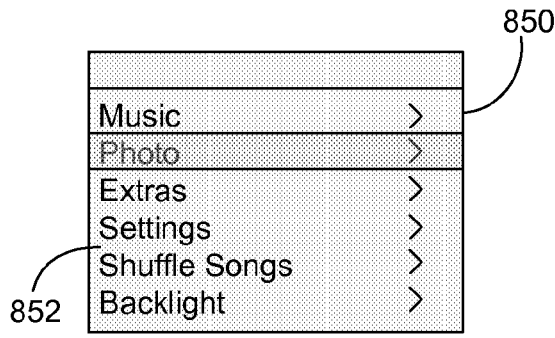
FIGS. 11A-11E are diagrams of several exemplary screen shots of a media player with photo viewing capabilities, in accordance with several embodiments of the present invention.

FIG. 10 is a media device operational method 800, in accordance with one embodiment of the present invention. The operational method 800 may for example be performed on a portable media device, and more particularly a portable music/photo player. The method 800 generally begins at block 802 where a main menu is presented to a user on a display. See for example FIG. 11A, which shows the main menu 850 presented on the display. The main menu 850 generally includes several options 852 associated with operating the media device. By way of example, the main menu 850 may include options 852 such as music, photos, extras, settings, shuffle songs and backlight. In most cases, each of the options 852 includes its own sub menu of sub options, which are associated with the main option. Each of these sub options may open another sub menu of sub options or they may initiate an action. By way of example, the music sub-menu may include music library, playlist, and browse options and the photo sub menu may include photo library, album and slide show setting options.

Figure 11B:
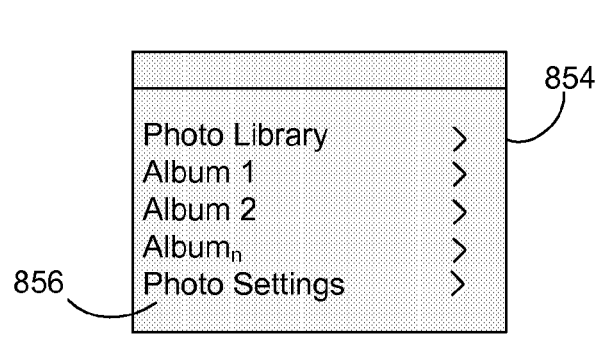

Following block 802, the method proceeds to block 804 where a determination is made as to whether the photo option was selected. If not, the method waits or proceeds back to block 802. If so (as shown by the slider bar in FIG. 11A), the method proceeds to block 806 where the photo sub menu is presented to the user on the display. By way of example, see FIG. 11B which shows the photo sub menu 854 presented on the display. The photo sub menu 854 may include one or more photo options 856, which may represent different modes of photo viewing, and which may give the user the ability to change settings associated with photo viewing. In the illustrated embodiment, the sub menu 854 includes a photo library option, one or more album options and a photo settings options.

Following block 806, the method proceeds to block 808 where a determination is made as to whether or not the library option is selected. If the library option is selected, the method proceeds to block 810 where all the stored images are retrieved. Thereafter, in block 812, the images are displayed based on predetermined settings. If the library is not selected, the method proceeds to block 814 where a determination is made as to whether or not the album option is selected. If the album option is selected, the method proceeds to block 816 where only the album images are retrieved. Thereafter, in block 818, the images are displayed based on predetermined settings.

In either of blocks 812 and 818, the entire group or some portion of the retrieved group can be displayed. The amount displayed generally depends on the number of images inside the library or album. If it is large, the screen may not be capable of displaying all of the images at once. In cases such as these, some of the images are kept out of the viewing area until the user decides to pull them up. The manner in which they are displayed generally depends on the desired display configuration established in the settings menu.

Figure 11C:
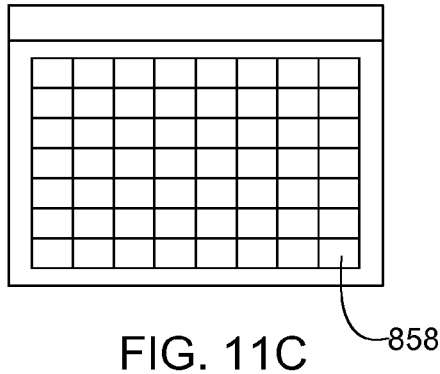
Figure 11D:
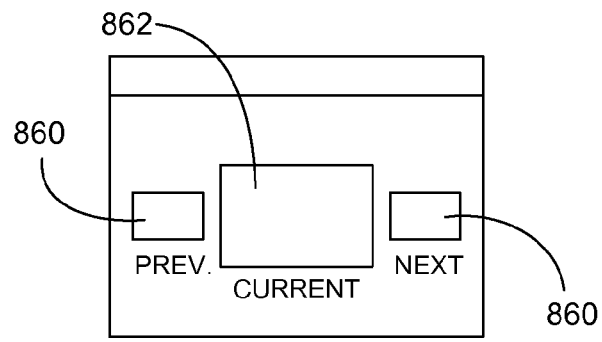
Figure 11E:
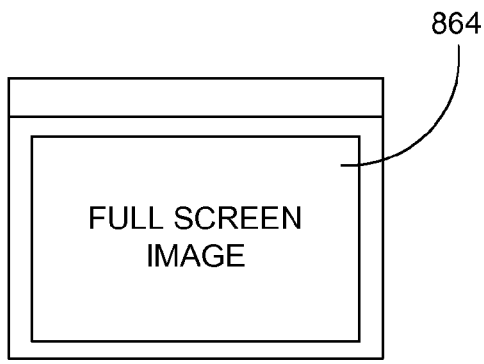

In browse mode, a large group of tiny thumbnails 858 are displayed in columns and rows as shown in FIG. 11C. The user can browse through the tiny thumbnails 858 via a scrolling action either image by image or row by row or column by column, etc. As the user scrolls through the images a new set of data (e.g., images or line of images) is brought into view in the viewing area. In most cases, once the viewing area is full, each new set of data appears at the edge of the viewing area and all other sets of data move over one position. That is, the new set of data appears for each set of data that moves out of the viewing area. In some cases, when a particular image is selected while browsing, the full screen version of that image is displayed as shown in FIG. 11E. Alternatively, the configuration shown in FIG. 11D may be displayed with the current image being the medium thumbnail of the image selected, and the previous and next images being the small thumbnails of the images located next to the image selected.

In slide show mode, only the previous, current, and next images are displayed. The previous and next images may be small thumbnails 860 while the current image may be a medium thumbnail 862 as shown in FIG. 11D. The user may traverse through the retrieved images by clicking a forward or back button, i.e., the forward button causes the current image to move to the previous image, the next image to move to the current image, and a new image to move into the next image. In some cases, when a the current image is selected while traversing through the slide show, the full screen version 864 of that image is displayed as shown in FIG. 11E.

Figure 11F:
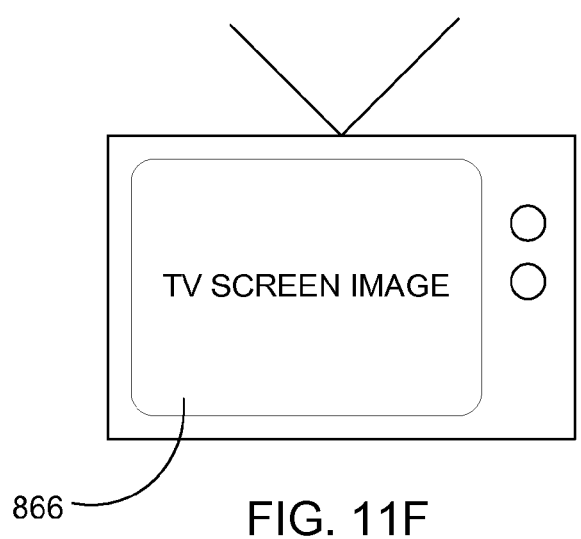
FIG. 11F is a diagram of a pictorial of a TV screen image provided by a television coupled to the media player, in accordance with one embodiment of the present invention.

In TV mode, the TV thumbnail(s) 866 is outputted to a TV for display as shown in FIG. 11F. The TV display may mimic what is being shown on the media player. For example, the TV display may display any of the previous screen shots (FIGS. 11C, 11D, 11E) or variations thereof. During a slide show, for example, the TV screen image may be based on the same original image as the current image in the slide show window.

If the album option is not selected, the method proceeds to block 820 where a determination is made as to whether or not the setting option is selected. If the setting option is selected, the method proceeds to block 822 where a setting menu is presented to the user on the display. The setting menu may include control settings pertaining to one or more display events. In fact, the setting menu may serve as a control panel for reviewing and/or customizing the control settings, i.e., the user may quickly and conveniently review the control settings and make changes thereto. Once the user saves the changes, the modified control settings will be employed to handle future display events. By way of example, the settings may include features that allow a user to assign music tracks to albums, to turn the assigned music on/off, to turn TV out on/off, to choose between modes, etc. The settings may also allow a user to select slide shows and whether to display the images in full screen or slide show mode and whether to show the images in random or sequenced order as well as to end or repeat when finished.

While this invention has been described in terms of several preferred embodiments, there are alterations, permutations, and equivalents, which fall within the scope of this invention. It should also be noted that there are many alternative ways of implementing the methods and apparatuses of the present invention. For example, although the invention is primarily directed at images, it should be noted that it may also be applied to music. In the case of music, different versions of the same song may be created, downloaded and stored. The different versions can be based on a variety of things including for example adjustments made to characteristics of the song (e.g., tempo, pitch), adding or removing elements of the song (e.g., voice or instrument), and/or the like. It is therefore intended that the following appended claims be interpreted as including all such alterations, permutations, and equivalents as fall within the true spirit and scope of the present invention.

What is claimed is:

1. A computing device, comprising:
    a data storage device for storing at least a plurality of media items; and
    a media management module configured to at least (i) receive a media request for at least one media item from a portable media device; (ii) obtain information regarding characteristics for the portable media device; (iii) obtain, based on the characteristics, a set of media items for each of the at least one media item being requested by the media request; and (iv) cause the set of media items to be sent to the portable media device.

2. A computing device as recited in claim 1, wherein the information regarding the characteristics for the portable media device includes at least device characteristics.

3. A computing device as recited in claim 2,
    wherein said data storage device stores device characteristics for a plurality of different portable media devices, and
    wherein the information regarding the device characteristics for the portable media device are obtained from said data storage device.

4. A computing device as recited in claim 1,
    wherein the media request includes identification information for the portable media device, and
    wherein said media management module uses the identification information to obtain the information regarding the characteristics for the portable media device.

5. A computing device as recited in claim 1, wherein said computing device further comprises:
    a communication module for sending data from or receiving data to said computing device.

6. A computing device as recited in claim 1, wherein the information regarding the characteristics for the portable media device are provided from the portable media device.

7. A computing device as recited in claim 1, wherein said media management module is further configured to receive an identifier from the portable media device, and to retrieve the information regarding the characteristics for the portable media device using the identifier.

8. A computing device as recited in claim 7, wherein the identifier can be within or associated with the media request.

9. A computing device as recited in claim 1, wherein the set of media items is a set of images, the set of images including at least a plurality of images having different sizes or formats but having essentially the same image data.

10. A computing device as recited in claim 1, wherein the information regarding the characteristics for the portable media device comprises or identifies at least one image profile, and wherein the set of media items being produced is based on the at least one image profile.

11. A computing device as recited in claim 10, wherein the at least one image profile identifies characteristics for an image.

12. A computing device as recited in claim 11, wherein the identified characteristics include at least one of: a format, a width, a height, a rotation, or a color adjustment.

13. A computing device as recited in claim 1, wherein the set of media items is a set of images, the set of images including at least a full screen image, a plurality of thumbnail images of various sizes, and a TV image.

14. A computing device as recited in claim 1, wherein the set of images includes at least (i) an original image corresponding to the at least one media item being requested by the media request, and (ii) a full screen image.

15. A computing device as recited in claim 1, wherein the set of images includes at least (i) an original image corresponding to the at least one media item being requested by the media request, and (ii) a plurality of thumbnail images of various sizes.

16. A computing device as recited in claim 1, wherein the set of images includes at least (i) an image for use on a monitor, and (ii) an image for use on a TV.

17. A computing device as recited in claim 1, wherein the information regarding characteristics for the portable media device identifies at least an image format, and wherein the set of media items for each of the at least one media item being requested by the media request is dependent on the at least the image format.

18. A computing device as recited in claim 1, wherein the information regarding characteristics for the portable media device identifies at least an image format and an image size, and wherein the set of media items for each of the at least one media item being requested by the media request is dependent on the at least the image format and the image size.

19. A computing device as recited in claim 1, wherein the information regarding characteristics for the portable media device identifies at least one display mode, and wherein the set of media items for each of the at least one media item being requested by the media request is dependent on the at least one display mode.

20. A computing device as recited in claim 19, wherein the at least one display mode has an image format associated therewith.

21. A computing device as recited in claim 1, wherein said media management module obtains the set of media items by generating the set of media items.

22. A computing device, comprising:
a data storage device for storing at least a plurality of media items; and
a media management module configured to at least (i) pre-process a plurality of media items to produce a plurality of additional media items from each of the media items based on characteristics pertaining to a portable media device; (ii) store the additional media items in said data storage device; and (iii) deliver at least the additional media items to said portable media device.

23. A computing device as recited in claim 22, wherein said computing device is a host computer.

24. A computing device as recited in claim 22, wherein the pre-process of the media items includes one or more of: scale, crop, rotation, or color correction.

25. A portable media device, comprising:
a data storage device configured to store media data pertaining to media items and to store device characteristics pertaining to said portable media device;
an output device; and
a processing device configured to (i) send at least a portion of the device characteristics to a host device, (ii) receive media data pertaining to one or more media items to be stored on said data storage device, the one or more media items having essentially the same media data, the received media data being obtained at the host device based on the device characteristics pertaining to said portable media device, (iii) storing the received media data to said data storage device, (iv) subsequently determining whether a particular media item of the one or more media items is to be output by said portable media device, (v) selecting an appropriate one of the determined media items to be output, and (vi) output the data for the selected determined media item.

26. The portable media device as recited in claim 25,
wherein said data storage device stores device characteristics for a plurality of different portable media devices, and
wherein the information regarding the device characteristics for the portable media device are obtained from said data storage device.

27. The portable media device as recited in claim 26, wherein the processing device responds to a media request for at least one media item received from a host device.

28. The portable media device as recited in claim 27,
wherein the media request includes identification information for the portable media device, and
wherein said processing device uses the identification information to obtain the information regarding the characteristics for the portable media device.

29. A computer readable medium that stores computer program code for managing media items, said computer readable medium comprising:
computer program code for receiving a media request for at least one media item from a portable media device, the media request including or referencing information regarding characteristics of the portable media device;
computer program code for generating, based on the characteristics, a set of media items for each of the at least one media item being requested by the media request, the set of the media items generated from the at least one media item including a plurality of media items that have essentially the same media data; and
computer program code for sending the set of media items to the portable media device.

30. A computer readable medium as recited in claim 29, wherein the media items are images, and wherein the characteristics are image formats.

31. The computer readable medium as recited in claim 30, wherein some of the images have different sizes or formats but have essentially the same image data.

32. The computer readable medium as recited in claim 30, wherein the information regarding the characteristics for the portable media device identifies at least one image profile, and wherein the set of media items being produced is based on the at least one image profile wherein the at least one image profile identifies characteristics for an image and wherein the identified characteristics include at least one of: a format, a width, a height, a rotation, or a color adjustment.

33. The computer readable medium as recited in claim 29,
wherein the media request includes identification information for the portable media device that is used to obtain the information regarding the characteristics for the portable media device.

34. The computer readable medium as recited in claim 33, further comprising:
receiving an identifier from the portable media device; and retrieving the information regarding the characteristics for the portable media device using the identifier wherein the identifier can be within or associated with the media request.

35. A method performed by a media management module comprising:
- receiving a media request from a portable media device for at least one media item, wherein the requested media item is stored in a data storage device suitable for storing at least a plurality of media items;
- obtaining information regarding characteristics for the portable media device;
- obtaining, based on the characteristics, a set of media items for each of the at least one media item being requested by the media request; and
- causing the set of media items to be sent to the portable media device.

36. The method as recited in claim 35, wherein the information regarding the characteristics for the portable media device includes at least device characteristics, wherein said data storage device stores device characteristics for a plurality of different portable media devices, and wherein the information regarding the device characteristics for the portable media device are obtained from said data storage device.

37. The method as recited in claim 35,
- wherein the media request includes identification information for the portable media device, and
- wherein said media management module uses the identification information to obtain the information regarding the characteristics for the portable media device.

38. The method as recited in claim 35, further comprising:
- receiving an identifier from the portable media device; and
- retrieving the information regarding the characteristics for the portable media device using the identifier wherein the identifier can be within or associated with the media request.

39. The method as recited in claim 35, wherein the set of media items is a set of images, the set of images including at least a plurality of images having different sizes or formats but having essentially the same image data.

40. The method as recited in claim 35, wherein the information regarding the characteristics for the portable media device identifies at least one image profile, and wherein the set of media items being produced is based on the at least one image profile wherein the at least one image profile identifies characteristics for an image and wherein the identified characteristics include at least one of: a format, a width, a height, a rotation, or a color adjustment.

41. A method performed by a portable media device having a data storage device configured to store media data pertaining to media items and to store device characteristics pertaining to said portable media device, an output device, and processing device, comprising:
- by the processing device,
  - sending at least a portion of the device characteristics to a host device in communication with the portable media device;
  - receiving media data pertaining to one or more media items to be stored on said data storage device, the one or more media items having essentially the same media data, the received media data being obtained at the host device based on the device characteristics pertaining to said portable media device;
  - storing the received media data to said data storage device;
  - subsequently determining whether a particular media item of the one or more media items is to be output by said portable media device at the output device;
  - selecting an appropriate one of the determined media items to be output; and
  - outputting the data for the selected determined media item at the output device, wherein the processing device responds to a media request for at least one media item received from a host device.

42. The method as recited in claim 41,
- wherein said data storage device stores device characteristics for a plurality of different portable media devices, and
- wherein the information regarding the device characteristics for the portable media device are obtained from said data storage device.

43. The method as recited in claim 42,
- wherein the media request includes identification information for the portable media device, and
- wherein said processing device uses the identification information to obtain the information regarding the characteristics for the portable media device.

* * * * *